(12) United States Patent
Higaki et al.

(10) Patent No.: US 7,251,346 B2
(45) Date of Patent: Jul. 31, 2007

(54) MOVING OBJECT DETECTION DEVICE, MOVING OBJECT DETECTION METHOD, AND MOVING OBJECT DETECTION PROGRAM

(75) Inventors: Nobuo Higaki, Saitama (JP); Takamichi Shimada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 664 days.

(21) Appl. No.: 10/713,431

(22) Filed: Nov. 17, 2003

(65) Prior Publication Data
US 2004/0101162 A1 May 27, 2004

(30) Foreign Application Priority Data
Nov. 19, 2002 (JP) .............................. 2002-334970
Mar. 31, 2003 (JP) .............................. 2003-093927

(51) Int. Cl.
*G06K 9/00* (2006.01)
(52) U.S. Cl. ....................... 382/106; 382/103; 382/154
(58) Field of Classification Search ................ 382/103, 382/106, 154
See application file for complete search history.

(56) References Cited

U.S. PATENT DOCUMENTS 5,835,880 A * 11/1998 Gan et al. .................... 701/205
6,674,877 B1 * 1/2004 Jojic et al. ................... 382/103
7,003,136 B1 * 2/2006 Harville ....................... 382/103
7,046,822 B1 * 5/2006 Knoeppel et al. ........... 382/103

FOREIGN PATENT DOCUMENTS

| JP | 08-210847 | 8/1996 |
| JP | 09-185720 | 7/1997 |
| JP | 2001-005975 | 1/2001 |
| JP | 2002-334970 | 1/2007 |

OTHER PUBLICATIONS

Patent Abstracts of Japan, 7-049950 dated Feb. 21, 1995.
Patent Abstracts of Japan, 8-329254 dated Dec. 13, 1996.

* cited by examiner

*Primary Examiner*—Ishrat Sherali
*Assistant Examiner*—Christopher Lavin
(74) *Attorney, Agent, or Firm*—Squire, Sanders & Dempsey L.L.P.

(57) ABSTRACT

A moving object detection device comprising: an object distance setting part, determining the distance to a moving object that moves the most based on a distance image, in which information on distances to image-taken objects are embedded, and a difference image, in which the movements of moving objects are embedded as movement information; an object distance image generating part, generating an object distance image corresponding to the abovementioned distance; and a contour extraction part, extracting a contour inside the object distance image to detect a moving object.

16 Claims, 22 Drawing Sheets

RELATIONSHIP BETWEEN PARALLAX AND MOVEMENT AMOUNT

OBJECT DISTANCE DETERMINATION
OBJECT DISTANCE IMAGE TDE

HISTOGRAM GENERATION

OBJECT REGION DETERMINATION

FIG.8
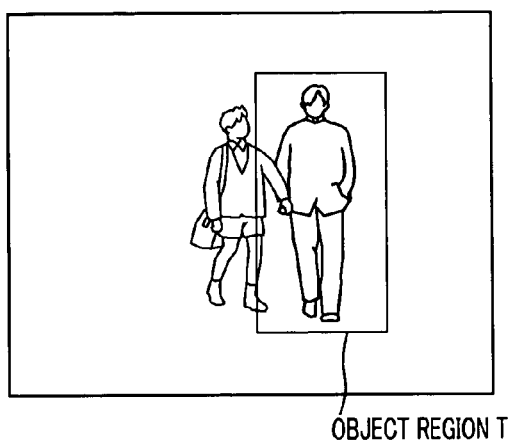
OBJECT DISTANCE IMAGE TDE
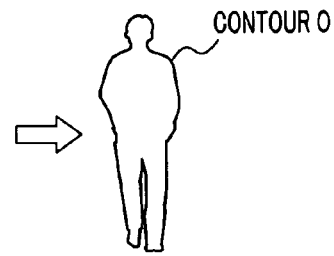
CONTOUR O
OBJECT REGION T
FIG.9
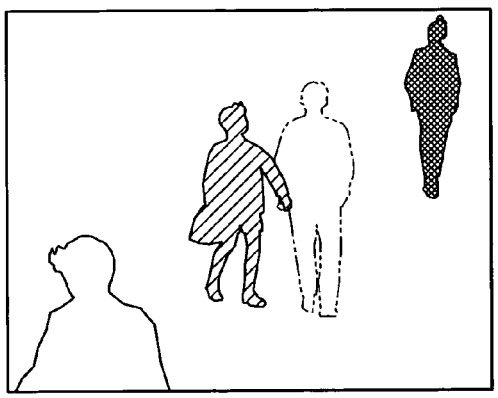
DISTANCE IMAGE DE
DISTANCE IMAGE PIXELS DEB
| (X, Y) | PARALLAX | (DISTANCE) |
|---|---|---|
| (0, 0) | 0 | (∞) |
| ⋮ | ⋮ | ⋮ |
| (30, 50) | 20→0 | (CHANGE TO ∞) |
| ⋮ | ⋮ | ⋮ |

RELATIONSHIP BETWEEN PARALLAX AND MOVEMENT AMOUNT

OBJECT DISTANCE DETERMINATION

OBJECT DISTANCE IMAGE TDE

MOVING OBJECT DETECTION DEVICE, MOVING OBJECT DETECTION METHOD, AND MOVING OBJECT DETECTION PROGRAM

BACKGROUND OF THE INVENTION

1. Field of the Invention

This invention concerns a moving object detection device, a moving object detection method, and a moving object detection program for detecting, from images taken by cameras, moving objects that exist in the images.

2. Description of Relevant Art

As a prior art of detecting, from an image taken by a CCD or other type of camera, objects that exist in the image, there is for example the art wherein initial ambiguous contours of objects are set as contour models and these contour models are reduced and deformed according to predetermined rules to extract the contours of the objects and thereby detect the objects (active contour model: snakes). In an object detection art based on this contour extraction, the edges of objects with movement (moving objects) are detected from images that are successive in time and the edges are joined to the contour models to extract the contours of moving objects and thereby detect the moving objects (see for example, Patent Literature 1).

Also as an art of separating and extracting individual objects from position (distance) information obtained from a stereo image, etc., there is the art wherein, for example, in a region that is recognized as an object in three-dimensional space, a restricted object position calculation region, in which the object is positioned, is set as an initial region according to the size of the object, the relative position of the object position calculation region with respect to the position of the center of gravity in three-dimensional coordinates of the object is computed, and when this relative position is within a predetermined range with respect to the position of the center of gravity, the position of the center of gravity is specified as the position of the object to thereby extract the object (see for example, Patent Literature 2).

Also as an art of detecting moving objects from images taken by a moving camera, there is the art of analyzing the movement of the moving camera from luminance information in images that are successive in time, this movement is presumed to be the movement of the background, and, based on the differences of the successive images and the movement of the background, the regions of moving objects are detected and extracted as contours (see for example, Non-Patent Literature 1).

[Patent Literature 1]

Japanese Unexamined Patent Publication No. Hei-8-329254 (p. 7, FIG. 9 and FIG. 10).

[Patent Literature 2]

Japanese Unexamined Patent Publication No. Hei-7-49950 (pp. 4 and 5, FIG. 1).

[Non-Patent Literature 1]

Matsuoka, Araki, Yamasawa, Takemura, Yokoya, "Extraction and Tracking of Moving Object Contours from Moving Camera Images and Real-Time Processing by DSP," The Institute of Electronics, Information and Communication Engineers, Technical Report of The Institute of Electronics, Information and Communication Engineers, PRMU 97–235, 1998.

However, of the above-described prior arts, with the art of the first example, wherein contour models are joined to edges, detected from successive images, to extract the contours of moving objects and thereby detect the objects, in a case where a plurality of objects exist adjacently in the taken images, these plurality of objects are recognized as a single object.

Also, of the above-described prior arts, with the art of the second example in which objects are extracted based on the center-of-gravity positions of the objects, calculations must be performed repeatedly until the relative position of the object position calculation region with respect to the center-of-gravity position falls within the predetermined range and thus the time for object extraction becomes long. This art thus could not be applied to a device, such as a moving robot, that is to perform recognition (extraction) of persons and other objects in real time.

Also, of the above-described prior arts, with the art of the third example in which moving objects are detected by a moving camera, since the entireties of images taken by the moving camera are processed as object regions for contour extraction, the calculation amount becomes large and thus a high-speed processing device is required for successive extraction of the contours of moving objects in real time. Furthermore, as with the above-described first example, in a case where a plurality of objects exist adjacently in the taken images, these plurality of objects are recognized as a single object.

There was thus a need for a moving object detection device, a moving object detection method, and a moving object detection program which enable the calculation processes for performing contour extraction of moving objects to be lightened even with images taken by moving cameras and enable detection of individual objects at high speed even in cases where a plurality of objects exist adjacently in the images taken.

SUMMARY OF THE INVENTION

This invention provides in a moving object detection device, detecting, from a plurality of taken images of image-taken objects taken by a plurality of synchronized image pickup means, moving objects existing among the above-mentioned image-taken objects, a moving object detection device includes a distance information generating means, generating distance information in the form of distances to the above-mentioned image-taken objects based on the parallaxes of the abovementioned plurality of taken images; a movement information generating means, generating movement information in the form of movements of the abovementioned moving objects based on the differences of taken images input in time series from at least one of the image pickup means among the abovementioned plurality of image pickup means; an object distance setting means, setting, based on the above-mentioned distance information and the abovementioned movement information, an object distance at which an above-mentioned moving object exists; an object distance image generating means, generating, based on the abovementioned distance information, an object distance image comprising pixels corresponding to the object distance set by the abovementioned object distance setting means; an object region setting means, setting, within the abovementioned object distance image and in correspondence to at least the abovementioned object distance, an object region to be subject to the detection of an above-mentioned moving object; and a contour extraction means, extracting a contour from the object region set by the abovementioned object region setting means and thereby detecting the above-mentioned moving object.

With this arrangement, the moving object detection device generates, by means of the distance information generation means, distance information in the form of distances to the image-taken objects based on the parallaxes of the plurality of taken images. For example, with pixels for which parallaxes are detected from the plurality of taken images, the magnitudes of the parallaxes (parallax amounts) are embedded in the respective pixels as parallaxes (distances) to the image-taken objects to generate a distance image (distance information).

Also, the moving object detection device generates, by means of the movement information generating means, movement information in the form of movements of the moving objects based on the differences of taken images input in time series from at least one of the image pickup means among the plurality of image pickup means. For example, the differences of two taken images input in time series are determined and a difference image, with which all pixel values not equal to "0" are set to "1," is generated as movement information on the moving objects.

Then by means of the object distance setting means, the moving object detection device specifies the parallax (distance) of greatest movement amount, based on the distance information and the movement information, and sets this parallax (distance) as the object distance.

Then by means of the object distance image generating means, the moving object detection device extracts pixels corresponding to the object distance from the distance image (distance information) and generates an object distance image. For example, the object distance is provided with some width (for example, several dozen cm, etc.) and pixels corresponding to this distance are extracted from the distance image. Then by means of the object region setting means, the object region that is to be subject to the detection of a moving object is set within the object distance image and in correspondence to at least the abovementioned object distance. For example, from within the object distance image generated using pixels corresponding to the object distance, a region in which pixels exist is set as the object region. A region inside the object distance image in which a moving object is presumed to exist can thus be narrowed down. Then by means of the contour extraction means, the contour of the moving object is extracted from the object region in the object distance image to thereby detect the moving object.

This invention's moving object detection device is also characterized in that in the above-described moving object detection device, the above-described object distance setting means determines, according to distance, the totals of pixels with which there is movement, and sets the object distance, at which an abovementioned moving object exists, based on these totals.

With this arrangement, the moving object detection device, by means of the object distance setting means, determines the totals of (generates a histogram of) pixel values, which are included in the movement information and with which there is movement, in accordance with the parallaxes (distances) included in the distance information, judges that moving objects of the greatest movement amount exist at the parallax (distance) for which the total is the greatest, and sets this parallax (distance) as the object distance. An object and a distance can thus be set by the simple operation of totaling pixels and the processes can thus be made high in speed.

Furthermore with the above-described moving object detection device, it is preferable for the above-described object distance image generating means to generate an object distance image comprising pixels that exist within a predetermined range in the depth direction based on at least the abovementioned object distance.

With this arrangement, the moving object detection device, by means of the object distance generating means, generates an object distance image by extracting just the pixels that exist within a priorly determined range (predetermined range) in the depth direction (front/rear direction) based, for example, on the object distance. Thus even if a plurality of moving objects exist in the same direction, it is preferable to generate an object distance image that specifies, from among these moving objects, a moving object that exists at the object distance.

Also with the above-described moving object detection device, it is preferable for the above-described object region setting means to set, based on pixel amounts in the vertical direction in the abovementioned object distance image, the object region within a predetermined range in the horizontal direction from the peak of the pixel amounts.

With this arrangement, in setting the object region in which a moving object exists by means of the object region setting means, the moving object detection device specifies a moving object's horizontal position based on the amounts of moving object pixels in the vertical direction in the object distance image. For example, the location of the highest amount (peak) of moving object pixels in the vertical direction is deemed to be the center of a moving object in the horizontal direction and a predetermined range with respect to this center is set as the region in which the moving object exists. Thus even in a case where a plurality of moving objects exist at the same distance, one among these moving objects can be detected.

Furthermore with the above-described moving object detection device, the abovementioned object region setting means preferably sets the vertical direction range of the abovementioned object region based on at least the tilt angle and the height from the installation surface of the abovementioned image pickup means.

With this arrangement, in setting the object region in which a moving object exists by means of the object region setting means, the moving object detection device sets the vertical direction range of the region in which a moving object exists based on the tilt angle of cameras, which are the image pickup means, the height from the installation surface that is the base of the cameras, and other camera parameters. For example, by setting the height of a moving object to a specific magnitude (for example, 2 m in the case of a person), the range within the object distance image in which a moving object is positioned can be specified based on this magnitude and the camera parameters.

Also, the above-described moving object detection device is characterized in further including an edge image generating means, generating an edge image by extracting edges from an abovementioned taken image based on the color information or gray scale information of the respective pixels of the taken image; and in that the abovementioned object distance image generating means extracts, based on the above-mentioned distance information, pixels of the abovementioned edge image that correspond to the abovementioned object distance to generate the abovementioned object distance image.

With this arrangement, the moving object detection device generates, by means of the edge image generating means, an edge image by extracting edges from a taken image based on the color information or gray scale information of the taken image. For example, by detecting, based on the brightness (luminance values) of a taken image, parts at which the brightness changes greatly as edges, an edge image made up of just the edges is generated. In the case where a taken image is a color image and a moving object is specified as being a person, edges can be detected, for example, by detecting the color of an uncovered facial region, etc. of a person (skin tone) as color information.

Then by means of the object distance image generating means, the moving object detection means generates, from the edge image, the object distance image existing in the object distance range. The operation of detecting edges can thus be eliminated when the contour extraction means extracts a contour from the object distance image.

The above-described moving object detection device preferably furthermore includes: a distance information renewal means, renewing the abovementioned distance information upon deeming the internal region of the contour extracted by the abovementioned contour extraction means as a region from which the abovementioned moving object has been extracted.

With this arrangement, the moving object detection device deems, by means of the distance information renewal means, the internal region of the contour extracted by the contour extraction means to be an extracted region from which the contour of a moving object has been extracted already and renews the distance information accordingly. Since the information on a moving object that has been extracted already is thereby deleted from the distance information, another moving object can be detected in succession.

This invention also provides in a moving object detection method, by which moving objects with movement are detected from among image-taken objects based on distance information, concerning distances to the abovementioned image-taken objects and generated based on taken images taken by a plurality of synchronized image pickup means, and movement information, generated based on taken images input in time series from at least one of the image pickup means among the above-mentioned plurality of image pickup means, a moving object detection method comprising: an object distance setting step of setting, based on the abovementioned distance information and the abovementioned movement information, an object distance at which an abovementioned moving object exists; an object distance image generating step of generating, based on the abovementioned distance information, an object distance image comprising pixels corresponding to the object distance set in the abovementioned object distance setting step; an object region setting step of setting, within the abovementioned object distance image and in correspondence to at least the abovementioned object distance, an object region to be subject to the detection of an abovementioned moving object; and a contour extraction step of extracting a contour from the object region set in the object region setting step and thereby detecting the abovementioned moving object.

With this moving object detection method, the parallax (distance) of greatest movement amount is specified based on the distance information, concerning distances to image-taken objects and generated based on the taken images taken by the plurality of synchronized image pickup means, and the movement information, generated based on taken images input in time series from at least one of the image pickup means among the plurality of image pickup means, and this parallax (distance) is set as the object distance in the object distance setting step.

Then in the object distance image generating step, pixels corresponding to the object distance are extracted from the distance image (distance information) to generate an object distance image. For example, the object distance is provided with some width (for example, several dozen cm, etc.) and pixels corresponding to this distance are extracted from the distance image. Then in the object region setting step, the object region that is to be subject to the detection of a moving object is set within the object distance image in accordance with at least the abovementioned object distance. A region inside the object distance image in which a moving object is presumed to exist can thus be narrowed down. Then in the contour extraction step, the contour of the moving object is extracted from the object region in the object distance image to thereby detect the moving object.

This invention also provides a moving object detection program, which, based on distance information, concerning distances to image-taken objects and generated based on taken images taken by a plurality of synchronized image pickup means, and movement information, generated based on taken images input in time series from at least one of the image pickup means among the abovementioned plurality of image pickup means, makes a computer function by the following means to detect moving objects that move from among the abovementioned image-taken objects.

That is, these means are: an object distance setting means, setting, based on the abovementioned distance information and the abovementioned movement information, an object distance at which an abovementioned moving object exists; an object distance image generating means, generating, based on the abovementioned distance information, an object distance image comprising pixels corresponding to the object distance set by the abovementioned object distance setting means; an object region setting means, setting, within the above-mentioned object distance image and in correspondence to at least the abovementioned object distance, an object region to be subject to the detection of an abovementioned moving object; and a contour extraction means, extracting a contour from the object region set by this object region setting means and thereby detecting the abovementioned moving object.

With this arrangement, the object distance detection program specifies the parallax (distance) of greatest movement amount, based on the distance information and the movement information, and sets this parallax (distance) as the object distance by means of the object distance setting means.

Then by means of the object distance image generating means, pixels corresponding to the object distance from the distance image (distance information) are extracted to generate an object distance image, and then by means of the object region setting means, a region inside the object distance image in which a moving object is presumed to exist is narrowed down and set as the object region. Then by means of the contour extraction means, the contour of the moving object is extracted from the object region in the object distance image to thereby detect the moving object.

This invention also provides in a moving object detection device, detecting, from a plurality of taken images of image-taken objects taken by a plurality of synchronized image pickup means, moving objects existing among the above-mentioned image-taken objects, a moving object detection device including: a distance information generating means, generating distance information in the form of distances to the abovementioned image-taken objects based on the parallaxes of the abovementioned plurality of taken images; a movement information generating means, generating movement information in the form of movements of the abovementioned moving objects based on the differences of taken images input in time series from at least one of the image pickup means among the abovementioned plurality of image pickup means; an object approach judging means, judging, based on the differences of the abovementioned distance information generated at predetermined time intervals, whether or not above-mentioned moving objects are approaching the abovementioned image pickup means; an object distance setting means, setting, based on the above-mentioned distance information and the above-mentioned movement information, an object distance at which an abovementioned moving object exists in the case where the judgment result of the object approach judgment means indicates that abovementioned moving objects are approaching the abovementioned image pickup means; an object distance image generating means, generating, based on the above-mentioned distance information, an object distance image comprising pixels corresponding to the object distance set by the abovementioned object distance setting means; an object region setting means, setting, within the abovementioned object distance image and in correspondence to at least the abovementioned object distance, an object region to be subject to the detection of an abovementioned moving object; and a contour extraction means, extracting a contour from the object region set by the abovementioned object region setting means and thereby detecting the abovementioned moving object.

With this arrangement, the moving object detection device generates, by means of the distance information generation means, distance information in the form of distances to the image-taken objects based on the parallaxes of the plurality of taken images. For example, with pixels for which parallaxes are detected from the plurality of taken images, the magnitudes of the parallaxes (parallax amounts) are embedded in the respective pixels as parallaxes (distances) to the image-taken objects to generate a distance image (distance information)

Also, the moving object detection device generates, by means of the movement information generating means, movement information in the form of movements of the moving objects, based on the differences of taken images input in time series from at least one of the image pickup means among the plurality of image pickup means. For example, the differences of two taken images input in time series are determined and a difference image, with which all pixel values not equal to "0" are set to "1," is generated as movement information of moving objects.

And by means of the object approach judging means, the moving object detection device determines the differences of the distance information generated at predetermined time intervals and judges whether or not moving objects have approached the image pickup means at the later time.

Then by means of the object distance setting means, the moving object detection device specifies, in the case where moving objects are approaching, the parallax (distance) of greatest movement amount, based on the distance information and the movement information, and sets this parallax (distance) as the object distance at which a moving object exists.

Then by means of the object distance image generating means, the moving object detection device extracts pixels corresponding to the object distance from the distance image (distance information) and generates an object distance image. For example, the object distance is provided with some width (for example, several dozen cm, etc.) and pixels corresponding to this distance are extracted from the distance image. Then by means of the object region setting means, the object region that is to be subject to the detection of a moving object is set within the object distance image and in correspondence to at least the abovementioned object distance. For example, from within the object distance image generated using pixels corresponding to the object distance, a region in which pixels exist is set as the object region. A region inside the object distance image in which a moving object is presumed to exist can thus be narrowed down. Then by means of the contour extraction means, the contour of the moving object is extracted from the object region in the object distance image to thereby detect the moving object.

Also, with the above-described moving object detection device, the above-described object distance setting means preferably sets the object distance by providing the distance, for which the total of the pixels with movement is the greatest, with a width in the depth direction, within which abovementioned moving objects exist, based on the differences of the abovementioned distance information generated at predetermined time intervals.

With this arrangement, the moving object detection device, by means of the object distance setting means, determines the totals of (generates a histogram of) pixel values, which are included in the movement information and with which there is movement, according to the parallaxes (distances) included in the distance information, judges that a moving object of the greatest movement amount exists at the parallax (distance) for which the total is the greatest, and sets this parallax (distance) as the object distance. Furthermore, the moving object detection device provides the object distance with a width in the front/rear depth direction corresponding to just the differences of the distance information generated at predetermined time intervals. The depth of the region to be the subject of detection can thus be specified even for a moving object that is approaching rapidly. Also, even if a plurality of moving objects exist in the same direction, an object distance image can be generated that specifies, from among these moving objects, a moving object that exists at the object distance.

Furthermore, the above-described moving object detection device is characterized in that the abovementioned object region setting means measures pixel amounts in the vertical direction in each of a plurality of object distance images generated by the abovementioned object distance image generating means, specifies the movement direction of an abovementioned moving object based on the positions at which the abovementioned pixel amounts peak in the respective abovementioned object distance images, and sets a priorly determined horizontal direction width in correspondence to the movement direction as the horizontal direction range of the abovementioned moving object.

With this arrangement, in setting an object region in which a moving object exists by means of the object region setting means, the moving object detection device determines, for each of two object distance images that are successive in a time series, the location (peak) in each object distance image with the highest amount of moving object pixels in the vertical direction as being the center of a moving object in the horizontal direction and specifies the vector joining these center positions as the direction of movement of the moving object.

The moving object detection device then sets the horizontal direction range of the moving object based on the direction of this vector (movement vector). For example, in the case where a moving object is a person and if the person is approaching rapidly, the horizontal direction region is set as corresponding to the shoulder width of the person, while if the person is moving across the front face of the moving object detection device, the horizontal direction region is set narrower than the shoulder width of the person. The region for detecting the moving object can thereby be restricted and the calculation amount for moving object detection can be lightened.

Furthermore with the above-described moving object detection device, the abovementioned object region setting means preferably sets the vertical direction range of the abovementioned object region based on at least the tilt angle and the height from the installation surface of the abovementioned image pickup means.

With this arrangement, the moving object detection device, in setting the object region in which a moving object exists by means of the object region setting means, sets the vertical direction range of the region in which the moving object exists based on the tilt angle of cameras, which are the image pickup means, the height from the installation surface that is the base of the cameras, and other camera parameters. For example, by setting the height of a moving object to a specific magnitude (for example, 2 m in the case of a person), the range within the object distance image in which the moving object is positioned can be specified based on this magnitude and the camera parameters.

Also, the above-described moving object detection device is characterized in further comprising: an edge image generating means, generating an edge image by extracting edges from an abovementioned taken image based on the color information or gray scale information of the respective pixels of the taken image; and in that the abovementioned object distance image generating means extracts, based on the abovementioned distance information, pixels of the abovementioned edge image that correspond to the abovementioned object distance to generate the above-mentioned object distance image.

With this arrangement, the moving object detection device generates, by means of the edge image generating means, an edge image by extracting edges in a taken image based on the color information or gray scale information of the taken image. For example, by detecting, based on the brightness (luminance values) of the taken image, parts at which the brightness changes greatly as edges, an edge image made up of just the edges is generated.

Then by means of the object distance image generating means, the moving object detection means generates, from the edge image, the object distance image existing in the object distance range. The operation of detecting edges can thus be eliminated when the contour extraction means extracts a contour from the object distance image.

This invention also provides in a moving object detection method, by which moving objects with movement are detected from among image-taken objects based on distance information, concerning distances to image-taken objects and generated based on taken images taken by a plurality of synchronized image pickup means, and movement information, generated based on taken images input in time series from at least one of the image pickup means among the abovementioned plurality of image pickup means, a moving object detection method comprising: an object approach judging step of judging, based on the differences of the abovementioned distance information generated at predetermined time intervals, whether or not above-mentioned moving objects are approaching the abovementioned image pickup means; an object distance setting step of setting, based on the abovementioned distance information and the above-mentioned movement information, an object distance at which an abovementioned moving object exists in the case where the judgment result of the object approach judgment step indicates that abovementioned moving objects are approaching the abovementioned image pickup means; an object distance image generating step, generating, based on the above-mentioned distance information, an object distance image comprising pixels corresponding to the object distance set in the abovementioned object distance setting step; an object region setting step of setting, within the abovementioned object distance image and in correspondence to at least the abovementioned object distance, an object region that is to be subject to the detection of an abovementioned moving object; and a contour extraction step of extracting a contour from the object region set in the object region setting step and thereby detecting the abovementioned moving object.

With this moving object detection method, in the object approach judging step, the differences of the distance information generated at predetermined time intervals are determined to judge whether or not moving objects have approached the image pickup means at the later time. Then if moving objects are approaching the image pickup means, the parallax (distance) of greatest movement amount is specified in the object distance setting step, based on the distance information, concerning the distances to the image-taken objects and generated based on the taken images taken by the plurality of synchronized image pickup means, and the movement information, generated based on the taken images input in time series from at least one of the image pickup means among the plurality of image pickup means, and this parallax (distance) is set as an object distance.

Then in the object distance image generating step, pixels corresponding to the object distance are extracted from the distance image (distance information) to generate an object distance image. For example, the object distance is provided with some width (for example, several dozen cm, etc.) and pixels corresponding to this distance are extracted from the distance image. Then in the object region setting step, an object region that is to be subject to the detection of a moving object is set within the object distance image in accordance with at least the abovementioned object distance. A region inside the object distance image in which a moving object is presumed to exist can thus be narrowed down. Then in the contour extraction step, the contour of the moving object is extracted from the object region in the object distance image to thereby detect the moving object.

This invention also provides a moving object detection program, which, based on distance information, concerning distances to image-taken objects and generated based on taken images taken by a plurality of synchronized image pickup means, and movement information, generated based on taken images input in time series from at least one of the image pickup means among the abovementioned plurality of image pickup means, makes a computer function by the following means to detect moving objects that move from among the abovementioned image-taken objects.

That is, these means are: an object approach judging means, judging, based on the differences of the abovementioned distance information generated at predetermined time intervals, whether or not abovementioned moving objects are approaching the abovementioned image pickup means; an object distance setting means, setting, in the case where the judgment result of the object approach judgment means indicates that abovementioned moving objects are approaching the abovementioned image pickup means and based on the abovementioned distance information and the above-mentioned movement information, an object distance at which an abovementioned moving object exists; an object distance image generating means, generating, based on the above-mentioned distance information, an object distance image comprising pixels corresponding to the object distance set by the abovementioned object distance setting means; an object region setting means, setting, within the abovementioned object distance image and in correspondence to at least the abovementioned object distance, an object region that is to be subject to the detection of an abovementioned moving object; and a contour extraction means, extracting a contour from the object region set by the abovementioned object region setting means and thereby detecting the abovementioned moving object.

With this arrangement, the moving object detection program determines, by means of the object approach judging means, the differences of the distance information generated at predetermined time intervals and judges whether or not moving objects have approached the image pickup means at the later time. Then in the case where moving objects are approaching, the parallax (distance) of greatest movement amount is specified based on the distance information and the movement information, and this parallax (distance) is set by the object distance setting means as the object distance.

Then by means of the object distance image generating means, pixels corresponding to the object distance from the distance image (distance information) are extracted to generate an object distance image, and then by means of the object region setting means, a region inside the object distance image in which a moving object is presumed to exist is narrowed down and set as the object region.

Then by means of the contour extraction means, the contour of the moving object is extracted from the object region in the object distance image to thereby detect the moving object.

With the present invention, based on a distance image (distance information), generated from camera images taken by a plurality of cameras, and a difference image (movement information), generated from camera images input in time series, a distance to the cameras of moving objects that are moving can be specified and an image (object distance image) based on just this distance can be generated. Moving objects (for example, persons, etc.) that appear joined in a camera image can thus be identified and separated according to distance and detected as separate moving objects.

Also with this invention, since the horizontal direction range of a moving object can be narrowed based on the amounts of moving object pixels in the vertical direction in the object distance image, a plurality of moving objects that exist side-by-side at the same distance can be separated and detected as separate moving objects.

Furthermore with this invention, since the vertical direction range of a moving object in the object distance image can be narrowed based on the tilt angle and the height from the floor of the cameras, the calculation amount required for contour extraction can be held down and the processing speed required for the detection of moving objects can be increased.

Also with this invention, since an edge image resulting from the extraction of edges is generated in advance from a camera image, there is no need to detect edges in the process of performing contour extraction on an individual moving object region (object region). Thus even in a case where a plurality of moving objects exist in a joined manner in a camera image, since the extraction of edges is not performed on overlapping regions, the moving objects can be detected at high speed.

Furthermore with this invention, whether or not a moving object is approaching can be judged, and thus by performing the detection of just the moving objects that are approaching, the amount of calculation required for contour extraction can be held down and the processing speed required for the detection of moving objects can be increased.

Also, the object distance and object region at and in which a moving object is to be detected can be set automatically and the object distance and object region can be restricted. The processing speed required for the detection of moving objects can thus be increased and the precision of detection can be increased.

Furthermore with this invention, since the vertical direction range of a moving object in an object distance image can be narrowed based on the tilt angle and the height from the floor of the cameras, the calculation amount required for contour extraction can be held down and the processing speed required for the detection of moving objects can be increased.

Also with this invention, since an edge image resulting from the extraction of edges is generated in advance from a camera image, there is no need to detect edges in the process of performing contour extraction on an individual moving object region (object region). Thus even in a case where a plurality of moving objects exist in a joined manner in a camera image, since the extraction of edges is not performed on overlapping regions, the moving objects can be detected at high speed.

BRIEF DESCRIPTION OF THE DRAWINGS

FIG. 8 is a diagram showing an example of extraction of a contour in the object region of the object distance image.

FIG. 9 is a diagram showing an example of renewal of the contents of the distance image based on the moving object region from which the contour was extracted.

DETAILED DESCRIPTION OF THE PREFERRED EMBODIMENT

Embodiments of this invention shall now be described with reference to the drawings.

[First Embodiment]

[Arrangement of the Moving Object Detection Device]

Figure 1:
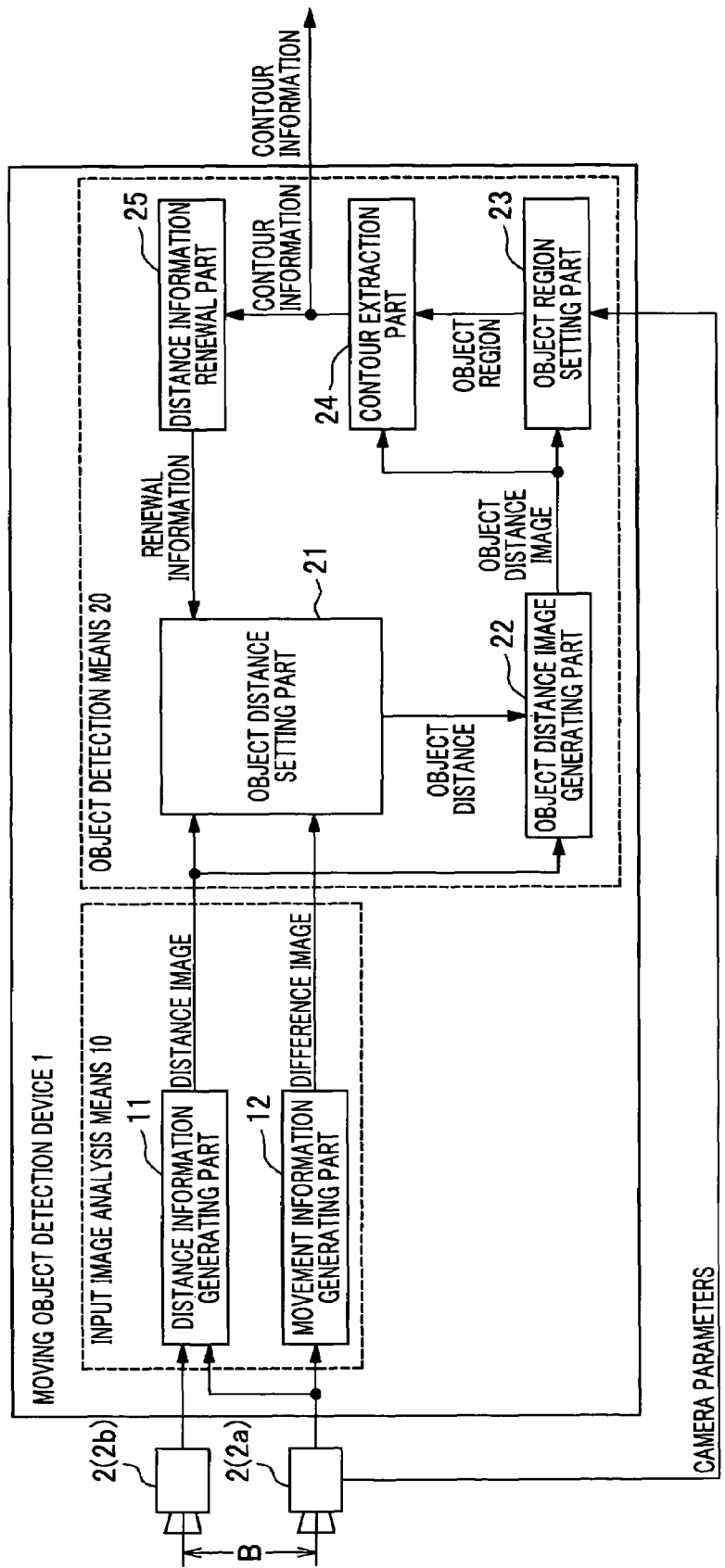
FIG. 1 is a block diagram showing the overall arrangement of a moving object detection device that is a first embodiment of this invention.

FIG. 1 is a block diagram showing the overall arrangement of a moving object detection device 1 that is a first embodiment of this invention. As shown in FIG. 1, moving object detection device 1 detects objects with movement (moving objects) from camera images (taken images) taken by two cameras (image pickup means) 2. Here, moving object detection device 1 is arranged from an input image analysis means 10, which analyzes the input camera images, and an object detection means 20, which detects objects from the analyzed camera images. The two cameras 2 are positioned apart to the right and left by just a distance B and these shall be referred to respectively as right camera 2a and left camera 2b.

Input image analysis means 10 analyzes camera images (taken images) that are input synchronously from the two cameras 2 (image pickup means 2a and 2b) that take image-taken objects and generates a distance image, containing distance information, and a difference image, containing movement information. Here input image analysis means 10 is arranged from a distance information generating part 11 and a movement information generating part 12.

Distance information generating part (distance information generating means) 11 embeds the parallaxes of two camera images, taken respectively by right camera 2a and left camera 2b at the same time, as the distance information on the distances from cameras 2 to the image-taken objects taken by cameras 2 (to be more accurate, the distances from the focal point position of cameras 2) and thereby generates a distance image.

With this distance information generating part 11, right camera 2a is used as a reference camera (reference image pickup means) and by performing block matching with a block of specific size (for example, 16×16 pixels) on the camera image (reference taken image) taken by the reference camera (right camera 2a) and the camera image (simultaneously-taken image) taken by left camera 2b, the parallaxes with respect to the reference taken image are measured. A distance image, in which the magnitudes of the parallaxes (parallax amounts) are made to correspond to the respective pixels of the reference taken image, is then generated.

Here, when a parallax is Z, the distance D (not shown) to an object from cameras 2 corresponding to this parallax Z can be determined by Formula (1), wherein f (not shown) is the focal distance of cameras 2 and B is distance between right camera 2a and left camera 2b.

$$D = B \times f / Z \qquad (1)$$

Movement information generating part (movement information generating means) 12 generates a difference image in which the movements of moving objects within a camera image are embedded as movement information based on the differences of two camera images taken in time series by the reference camera (right camera 2a).

At this movement information generating part 12, right camera 2a is deemed to be the reference camera (reference image pickup means) and the differences of two camera images taken in time series (at time t and time t+1) by this reference camera (right camera 2a) are determined. A difference image is then generated in which a pixel with which there is a difference is regarded as a pixel with which there is movement and is provided with a pixel value of "1" while a pixel with which there is no difference is regarded as a pixel with which there is no movement and is provided with a pixel value of "0." Also at movement information generating part 12, a filtering process using a median filter, etc. is performed on the difference image to eliminate noise.

In a case where cameras 2 are arranged as moving cameras and the background inside the camera images that are taken changes, the pan, tilt, and other camera movement amounts are input according to each camera image from cameras 2, and for example by correcting a camera image at time t+1 by the camera movement amounts, just the pixels with which there is movement at time t and time t+1 are detected.

Figure 4:
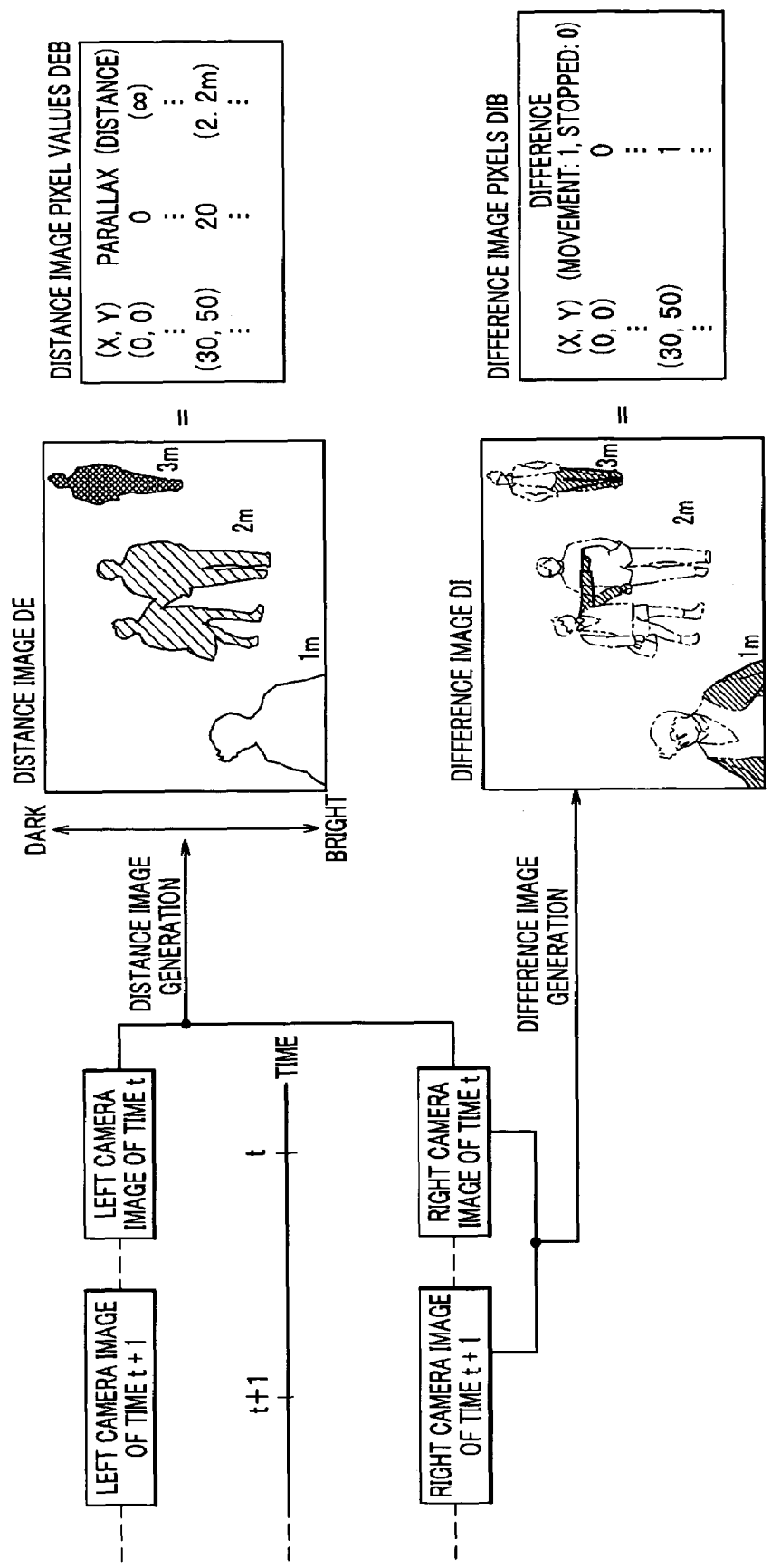
FIG. 4 is a diagram showing an example of the contents of a distance image and a difference image.

The contents of a distance image generated by distance information generating part 11 and a difference image generated by movement information generating part 12 shall now be described with reference to FIG. 4 (and with reference to FIG. 1 where necessary). FIG. 4 is a diagram showing an example of the image contents of a distance image DE and a difference image DI and the pixel values of the respective images (distance image pixel values DEB and difference image pixel values DIB). Here, it shall be deemed that persons exist at positions approximately 1 m, 2 m, and 3 m away from cameras 2.

As shown in FIG. 4, distance image DE is generated by expressing the parallaxes of the right camera image and the left camera image at time t as pixel values. The greater the value of this parallax, the closer the position of the corresponding person to cameras 2 and the smaller the value of this parallax, the further the position of the corresponding person from cameras 2. For example, as indicated by distance image pixel values DEB, for the pixel position (0, 0) of distance image DE, the parallax is 0, thus indicating that the distance of this pixel position from cameras 2 is infinity (∞). Also, for the pixel position (30, 50) of distance image DE, the parallax is 20, thus indicating that the distance of this pixel position from cameras 2 is a distance corresponding to a parallax of 20, for example, 2.2 m. Since distance image DE thus expresses the parallaxes as pixel values, the image is one with which an object is shown as being brighter the closer it is to cameras 2 and as being darker the further away it is from cameras 2.

Also, difference image DI is generated by determining the differences of a right camera image of time t and a right camera image of time t+1 and expressing a pixel with which there is a difference by a pixel value of "1" and a pixel with which there is no difference with a pixel value of "0." Pixels for which this difference exists express regions in which persons are actually moving. For example, as indicated by difference image pixel values DIB, the value for pixel position (0, 0) of difference image DI is "0," which indicates a "stopped" state and thus signifies that there is no movement. Also, the value for pixel position (30, 50) of difference image DI is "1," which indicates "movement" and thus signifies that there is movement. The description shall now be continued with reference again to FIG. 1.

Object detection means 20 detects a region of a moving object with movement based on the images (distance image and difference image) analyzed by input image analysis means 10 and extracts the contour of the moving object. Here, moving object detection means 20 is arranged from an object distance setting part 21, an object distance image generating part 22, an object region setting part 23, a contour extraction part 24, and a distance information renewal part 25.

Object distance setting part (object distance setting means) 21 specifies a moving object with the greatest movement amount based on the distance image generated at distance information generating part 11 of input image analysis means 10 and the difference image generated at movement information generating part 12 and sets the parallax (object distance) at which the moving object to be subject to detection exists. This object distance is notified to object distance image generating part 22.

At this object distance setting part 21, for each parallax (distance) expressed in the distance image, the values of the pixels of the difference image at the same positions as the pixels corresponding to the parallax are totaled, and a moving object of the greatest movement amount is judged to exist at the parallax (highest-total parallax) for which the total is the highest. It shall be deemed that object distance setting part 21 stores the distance image generated by distance information generating part 11 and the difference image generated by movement information generating part 12 in an unillustrated memory or other storage means.

Object distance image generating part (object distance image generating means) 22 generates an object distance image, with which pixels corresponding to the object distance set at object distance setting part 21 are extracted from the distance image, which was generated at distance information generating part 11 and in which parallax amounts are embedded.

Here, it shall be assumed that a person is to be detected and a parallax width (depth) corresponding to the object distance (highest-total parallax)±α (a few dozen cm) shall be deemed to be the parallax range in which a moving object of the greatest movement amount exists. The value of this α indicates a depth direction range (predetermined range) based on the object distance and is determined in advance according to the size in the depth direction of the object that is to be subject to detection.

For example, by calculating the distance D from cameras 2 to the moving objects of the highest-total parallax by the abovementioned Formula 1, the range Zr of the parallax is obtained as indicated by Formula (2), which is obtained by revising Formula (1). Here the focal distance of cameras 2 shall be f and the distance between right camera 2a and left camera 2b shall be B.

$$B \times f/(D+\alpha) < Zr < B \times f/(D-\alpha) \qquad (2)$$

Here, it shall be deemed that an object distance image, obtained by extracting the pixels corresponding to parallaxes of the range defined by Formula (2), is generated at this object distance image generating part 22.

For the generation of this object distance image, just the pixels of pixel positions corresponding to the object distance (parallax range) may be extracted from the camera image (original image) taken by the reference camera (right camera 2a).

Figure 5A:
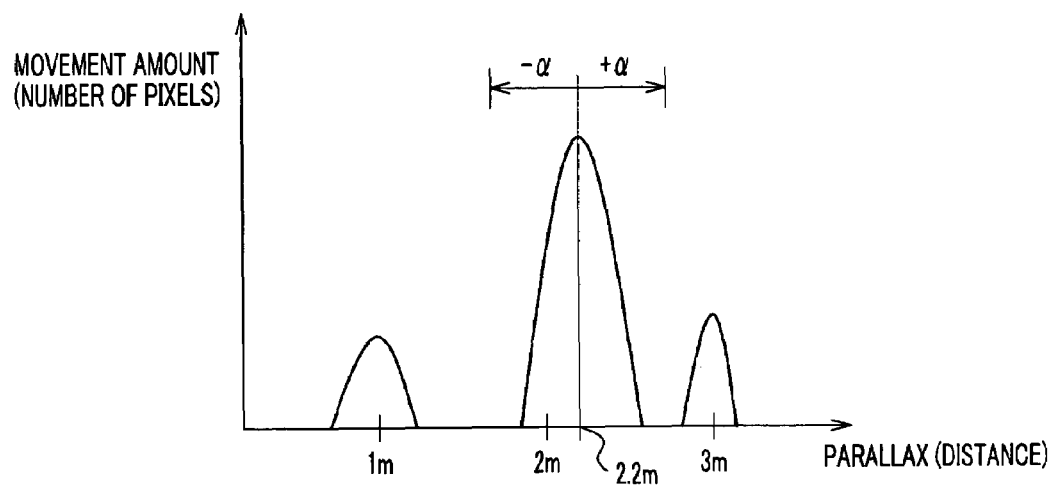
FIG. 5A is a graph showing the relationship between the parallax (distance) and the movement amount (number of pixels) determined by totaling pixels with which there is movement.
Figure 5B:
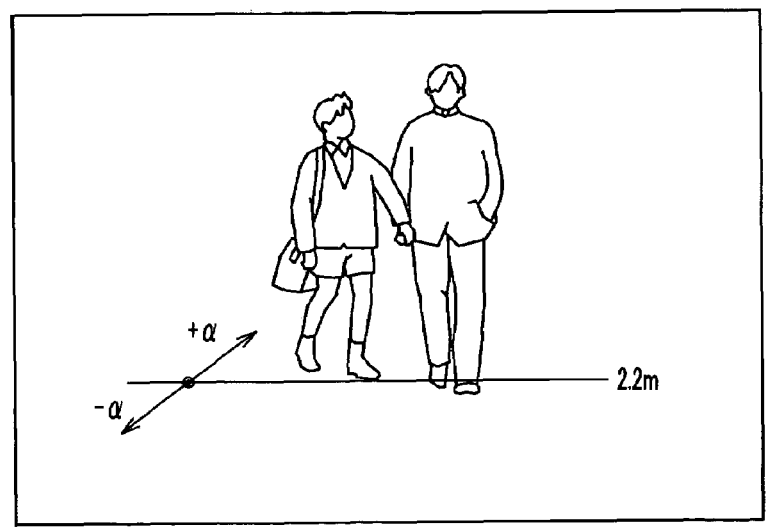
FIG. 5B is a diagram showing an object distance image obtained by extracting just the image of the object distance from the distance image.

The procedure by which the image (object distance image) corresponding to the distance at which a moving object that is subject to detection exists, is generated by object distance setting part 21 and object distance image generating part 22 shall now be described with reference to FIG. 5 (and with reference to FIG. 1 where necessary). FIG. 5A is a graph showing the relationship, based on distance image DE and difference image DI (FIG. 4), between the parallax (distance) and the movement amount (number of pixels) determined by totaling pixels with which there is movement. FIG. 5B shows an object distance image TDE obtained by extracting just the image of the object distance from distance image DE (FIG. 4).

When as shown in FIG. 5A, the relationship between the parallax (distance) of distance image DE (FIG. 4) and the movement amount (number of pixels) is expressed by a graph, the movement amount peaks at parallax (distance) positions of 1 m, 2.2 m, and 3 m. Thus object distance setting part 21 deems that a moving object exists at the parallax (2.2 m) at which the movement amount is the greatest and sets 2.2 m as the object distance. If it is assumed that a moving object is a person, it can be judged that a person exists in the range of 2.2±αm (α=0.5 m) from cameras 2.

Then as shown in FIG. 5B, object distance image generating part 22 generates object distance image TDE, with which pixels existing at the object distance ±αm (2.2±0.5 m), set at object distance setting part 21, are extracted from the distance image generated at distance information generating part 11. The images of persons existing at positions 1 m and 3 m way from cameras 2 are thus deleted to generate object distance image TDE, with which just the persons existing at a position 2.2±0.5 m away is extracted.

The description shall now be continued with reference to FIG. 1 again.

Object region setting part (object region setting means) 23 totals the numbers of pixels in the vertical direction of the object distance image, generated at object distance image generating part 22, specifies the position (peak) at which the total number of pixels in the vertical direction is the greatest as being the horizontal position of the center of a moving object, and thereby sets a region (object region) that contains the moving object.

More specifically, at this object region setting part 23, the numbers of pixels in the vertical direction of the object distance image generated at object distance generating part 22 are counted to generate a histogram and the position at which the histogram indicates the highest value (peak) is specified as the horizontal position of the center of a moving object. Here, it is assumed that a person is to be detected and a range, centered at the horizontal position at which the histogram takes on the highest value and having a specific size (for example 0.5 to 0.6 (m)) to the left and right, is set as the existence region (range) in the horizontal direction of the object region. Also for the vertical direction, a specific size (for example 2 (m)) is set as the height of the object region. In this process, object region setting part 23 sets the existence region (range) in the vertical direction of the object region based on camera parameters, such as the tilt angle, height from the floor (installation surface), etc., that are input from cameras 2.

By thus judging the position at which the histogram takes on the highest value as being the center of a moving object, even when a plurality of moving objects (persons, etc.) exist at the same distance, just one (one person) among the plurality can be detected.

Figure 6A:
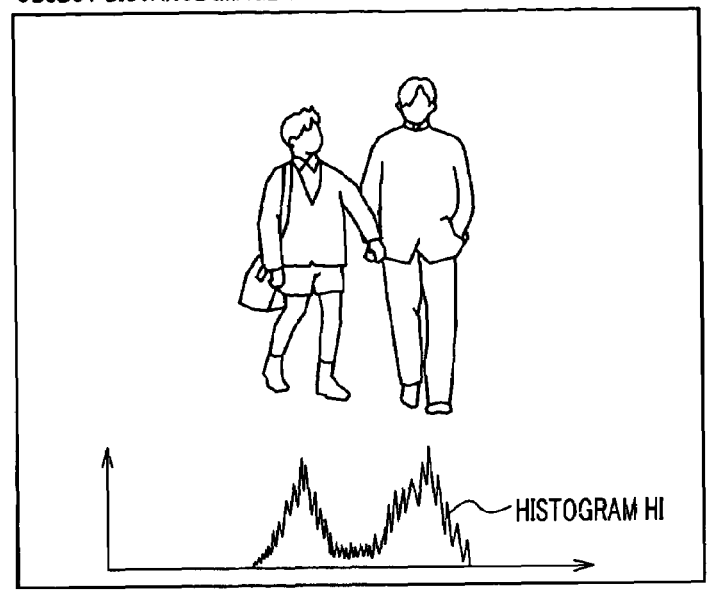
FIG. 6A is a histogram expressing the totals of the number of pixels in the vertical direction in an object distance image generated by an object distance generating part.
Figure 6B:
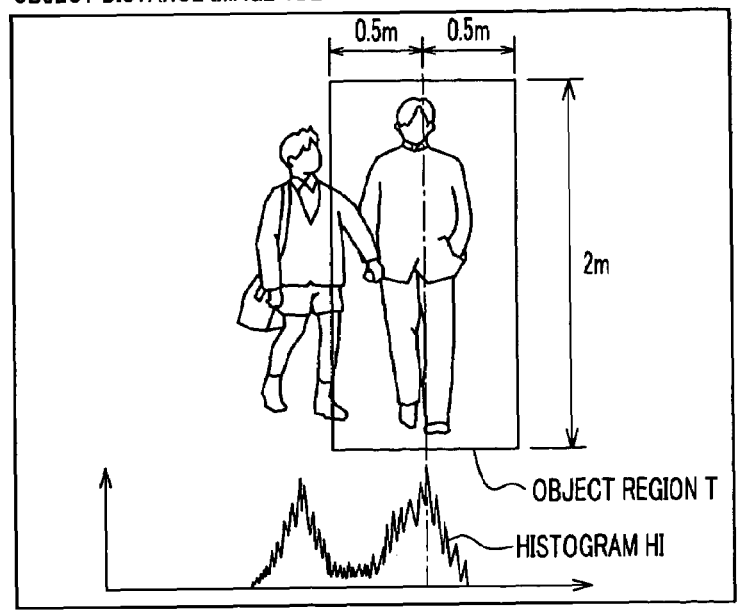
FIG. 6B is a diagram, showing a state in which an object region is set with a person as a moving object in the object distance image.

The procedure, by which object region setting part 23 sets the region (object region) of one moving object (one person) from inside object distance image TDE, shall now be described with reference to FIG. 6 (and with reference to FIG. 1 where necessary). FIG. 6A expresses, by a histogram HI, the totals of the number of pixels in the vertical direction in object distance image TDE generated at object distance generating part 22. FIG. 6B shows the state in which an object region T is set with a person as a moving object in object distance image TDE. Though in FIG. 6A and FIG. 6B, histogram HI is overlapped onto object distance image TDE, this overlapping is done only for the sake of description.

Object region setting part 23 generates histogram HI by totaling the numbers of pixels in the vertical direction of object distance image TDE as shown in FIG. 6A. By thus forming a histogram of object distance image TDE, it becomes possible to judge that the horizontal position of the center of a moving object exists at the position at which the value of histogram HI is the highest. For example, if histogram HI is not used and the position of the pixel of a value that is not 0 that exists at the highest position in object distance image TDE is judged to be the horizontal position of the center of a moving object, in a case where a person raises his/her hand, the tip of this hand will be judged to be the center of the person (moving object). Histogram HI is thus used here.

Then as shown in FIG. 6B, object region setting part 23 sets the range centered at the horizontal position at which histogram HI takes the highest value and having a specific size (for example, 0.5 m) to the left and right as the horizontal direction range of object region T. Also for the vertical direction, a specific size (for example, 2 m) is set as the vertical direction range of object region T.

Figure 7A:
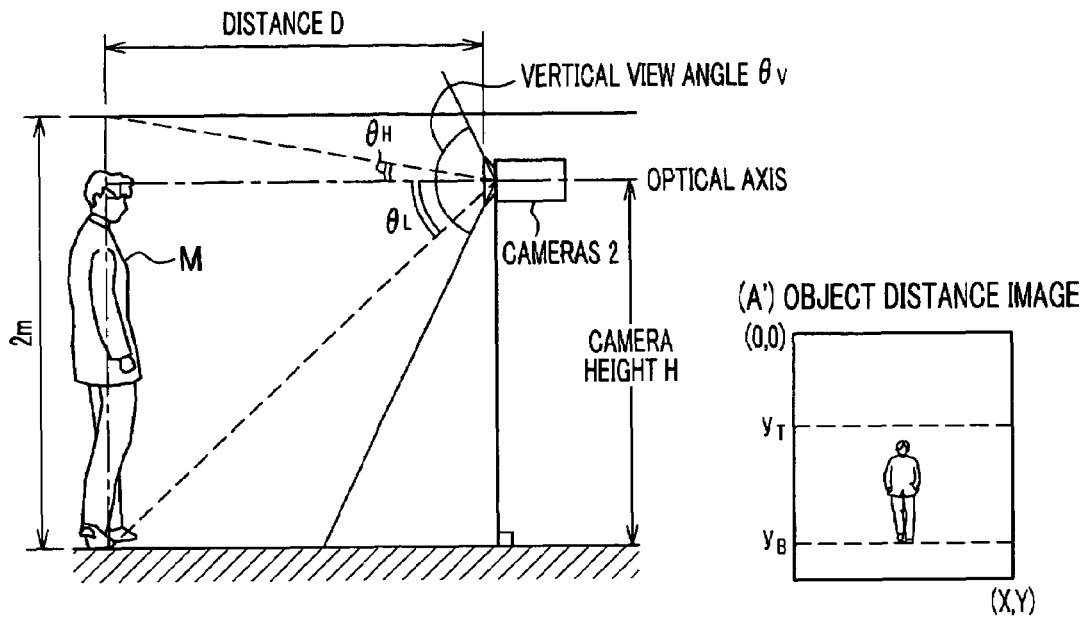
FIG. 7A is an explanatory diagram for describing the procedure for calculating the height at which a moving object is positioned in the object distance image when the tilt angle of a camera is 0°.
Figure 7B:
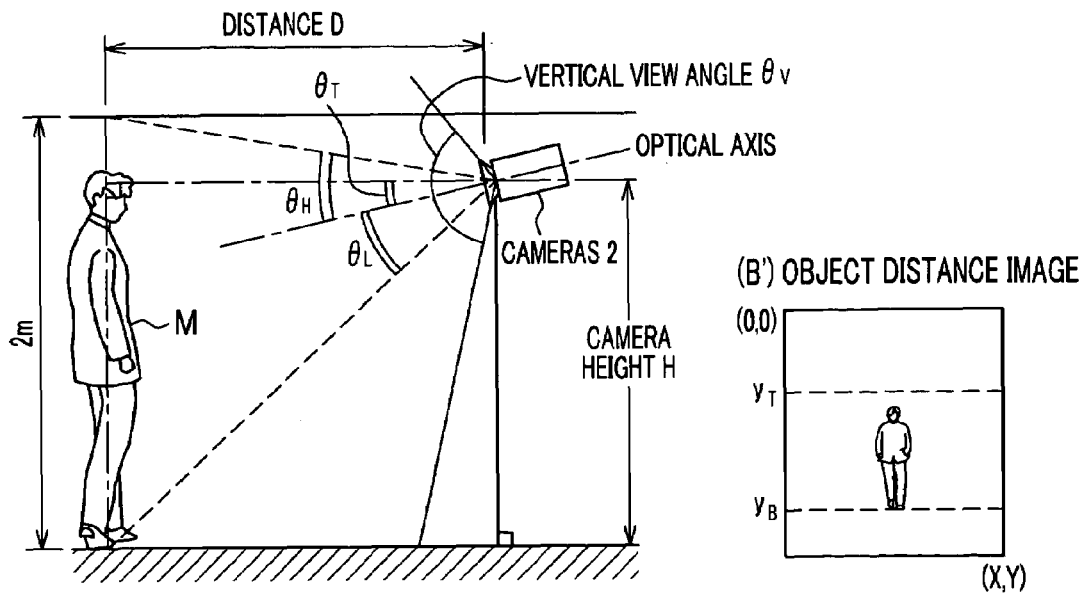
FIG. 7B is an explanatory diagram for describing the procedure for calculating the height at which a moving object is positioned in the object distance image when the tilt angle of a camera is an angle besides 0°.

The size of this object region T shall now be described further with reference to FIG. 7 (and with reference to FIG. 1 where necessary). FIG. 7 is an explanatory diagram for describing the height at which moving object M is positioned in the object distance image (A', B') when cameras 2 are incorporated in a moving robot (not shown) and are positioned at a certain height (camera height) H from the same floor as moving object M. FIG. 7A illustrates the correspondence between cameras 2 and moving object M in the case where the tilt angle of cameras 2 is 0 (°) and FIG. 7B illustrates that in the case where the tilt angle of cameras 2 is $\theta_T$ (≠0).

First, the method of specifying the vertical direction position at which moving object M exists in the object distance image (A') in the case where the tilt angle is 0 (°) shall be described with reference to FIG. 7A.

Here, let the vertical view angle of cameras 2 be $\theta_v$, the distance from cameras 2 to moving object be D, the definition in the vertical direction of the object distance image (A') be Y, the height (camera height) of cameras 2 from the floor be H, and the virtual height of moving object M from the floor be 2 (m). In this case, the angle $\theta_H$, between the optical axis of cameras 2 and a straight line joining cameras 2 with the virtual top end (2 m from the floor) of moving object M, can be expressed by Formula (3).

$$\theta_H = \tan^{-1}((2-H)/D) \qquad (3)$$

The top end $y_T$ of moving object M in the object distance image (A') can then be determined by Formula (4).

$$y_T = Y/2 - \theta_H Y/\theta_v \qquad (4)$$
$$= Y/2 - (Y/\theta_v)\tan^{-1}((2-H)/D)$$

Also, the angle $\theta_L$, between the optical axis of cameras 2 and a straight line joining cameras 2 with the bottom end (floor) of moving object M, can be expressed by Formula (5).

$$\theta_L = \tan^{-1}(H/D) \qquad (5)$$

The bottom end $y_B$ of moving object M in the object distance image (A') can then be determined by Formula (6).

$$y_B = Y/2 - \theta_L Y/\theta_v \qquad (6)$$
$$= Y/2 + (Y/\theta_v)\tan^{-1}(H/D)$$

Next, the method of specifying the vertical direction position at which moving object M exists in the object distance image (B') in the case where the tilt angle is $\theta_T$ (≠0) shall be described with reference to FIG. 7B.

Here, let the vertical view angle of cameras 2 be $\theta_v$, the tilt angle be $\theta_T$, the distance from cameras 2 to moving object M be D, the definition in the vertical direction of the object distance image be Y, the height (camera height) of cameras 2 from the floor be H, and the virtual height of moving object M from the floor be 2 (m). In this case, the difference angle ($\theta_H-\theta_T$) between the angle $\theta_H$, between the optical axis of cameras 2 and a straight line joining cameras 2 with the virtual top end (2 m from the floor) of moving object M, and the tilt angle $\theta_T$, can be expressed by Formula (7)

$$\theta_H-\theta_T=\tan^{-1}((2-H)/D) \quad (7)$$

The top end $y_T$ of moving object M in the object distance image (B') can then be determined by Formula (8).

$$y_T = Y/2 - \theta_T Y/\theta_v - (\theta_H - \theta_T)Y/\theta_v \quad (8)$$
$$= Y/2 - \theta_T Y/\theta_v - (Y/\theta_v)\tan^{-1}((2-H)/D)$$

Also, the sum angle ($\theta_L+\theta_T$) of the angle $\theta_L$, between the optical axis of cameras 2 and a straight line joining cameras 2 with the bottom end (floor) of moving object M, and the tilt angle $\theta_T$ can be expressed by Formula (9).

$$\theta_L+\theta_T=\tan^{-1}(H/D) \quad (9)$$

The bottom end $y_B$ of moving object M in the object distance image (B') can then be determined by Formula (10).

$$y_B = Y/2 - \theta_T Y/\theta_v + (\theta_L + \theta_T)Y/\theta_v \quad (10)$$
$$= Y/2 - \theta_T Y/\theta_v + (Y/\theta_v)\tan^{-1}(H/D)$$

The range in the vertical direction of object region T (FIG. 6B) is determined by the top end $y_T$ and bottom end $y_B$ in the object distance image (A' or B') that were determined as described above.

In a case where a moving robot (not shown) ascends or descends stairs, etc. and does not exist on the same floor as moving object M, the position of moving object M in the vertical direction in the object distance image (A' or B') can be specified by detecting the amount of ascent or descent by means of an encoder, etc. in the main body of the moving robot and adding or subtracting the amount of ascent or descent from the height of moving object M from the floor. Or, the moving robot may be made to hold map information and the height of the floor specified by the direction and distance of moving object M may be acquired from the map information.

In regard to the range of object region T (FIG. 6B) in the horizontal direction, if, though not illustrated, the horizontal view angle of cameras 2 is $\theta_h$, the distance from cameras 2 to moving object M that is subject to detection is D, and the resolution in the horizontal direction of the object distance image is X, the number of horizontal pixels $\alpha_H$ in the object distance image, when half of the width of the object region (the distance from the center of the moving object) is set to 0.5 (m), can be determined by Formula (11).

$$\alpha_H=(X/\theta_h)\tan^{-1}(0.5/D) \quad (11)$$

The description shall now be continued with reference to FIG. 1 again.

Contour extraction part (contour extraction means) 24 performs, within the moving object region (object region) set by object region setting part 23 in the object distance image generated by object distance image generating part 22, the extraction of a contour using a known contour extraction art. The contour (contour information) that is extracted here is output to the exterior as an output of moving body detection device 1 and also notified to distance information renewal part 25. By a contour being extracted by contour extraction part 24, it is deemed that a moving object has been detected.

The procedure for contour extraction, which is a known art, shall now be described in outline.

First, edges are detected based on variations in the pixel values inside the object region. For example, edges are detected by multiplying each pixel by an operator, having weight factors for pixels in the vicinity regions of certain pixels (a factor array, such as a Sovel operator, Kirsch operator, etc.). The detected edges are then binarized using a suitable threshold value and isolated points are eliminated using a median filter, etc. By then joining edges that have thus been binarized, the contour of a moving object can be extracted from inside the object region. As a method of extracting a contour from edges, an active contour model (SNAKES) may be applied. A contour O can thus be extracted from inside object region T, with which moving objects have been restricted to one object (one person) inside object region image TDE, as shown for example in FIG. 8.

Distance information renewal part (distance information renewal means) 25 renews, on the basis of the contour (contour information) extracted at contour extraction part 24, the distance image stored in the storage means (not shown) by object distance setting part 21. For example, the pixel values of the distance image corresponding to an internal region including the contour are set to "0." The region of the moving object for which contour extraction has been completed is deleted from the distance image. Distance information renewal part 25 notifies that this renewal of the distance image has been completed as renewal information, to object distance setting part 21.

For example, the contents (distance image pixel values DEB) of distance image DE corresponding to the interior of contour O (the internal region including contour O) that was extracted in FIG. 8 are renewed as shown in FIG. 9. That is, all pixel values inside the region of contour O, that is for example, the parallax at pixel position (30, 50), etc. inside contour O, are set to 0. By thus changing the parallaxes inside the region of contour O to 0, the distance from the camera 2 of the moving object extracted as contour O becomes infinite and thus this object will no longer exist in distance image DE.

The arrangement of moving object detection device 1, which is the first embodiment, was described above, and with moving object detection device 1, the respective means may be realized in a computer as corresponding functional programs and the respective functional programs may be joined together to operate as a moving object detection program.

Also, though here, distance information generating part 11 of moving object detection device 1 generates a distance image based on camera images taken by two cameras 2, arrangements may be made to generate a distance image from three or more cameras. For example, by using nine cameras positioned in three rows and three columns, using the camera positioned at the center as the reference camera, and generating a distance image based on the parallaxes with respect to the other cameras, the distance to a moving object can be measured more accurately.

Also, this moving object detection device 1 may be incorporated in a moving robot, automobile, or other moving body and used to detect persons and other objects. For example, by applying the present invention to a moving robot, the moving robot may be made to recognize persons even in a crowd. Furthermore, since persons can be detected individually, processing after contour extraction, for example, the tracking of a certain person or performing of different operations according to different persons, etc. upon performing face recognition, etc., can be facilitated.

(Operations of Moving Object Detection Device 1)

Figure 2:
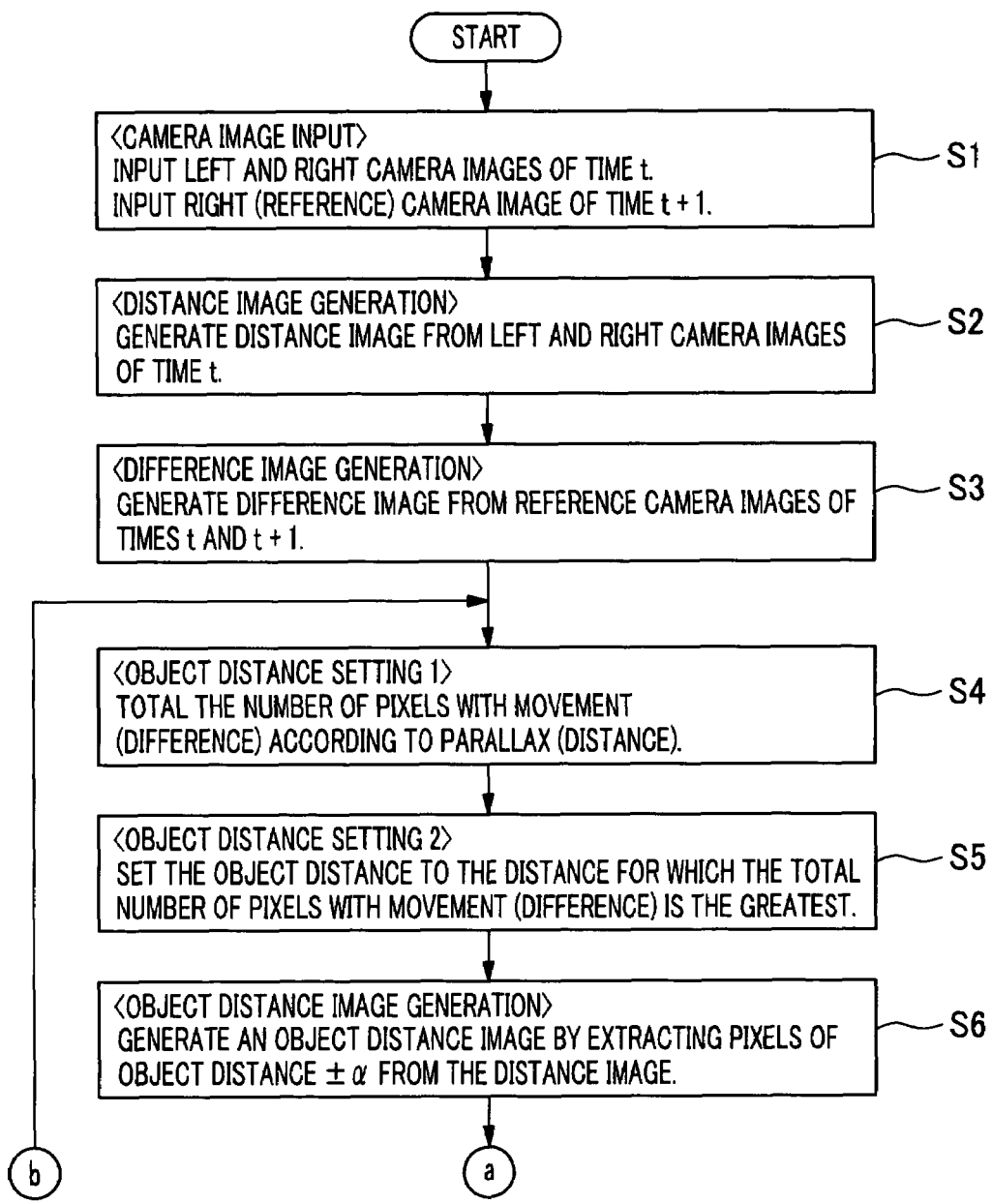
FIG. 2 is a flowchart (1/2) showing the operations of the moving object detection device that is the first embodiment of this invention.
Figure 3:
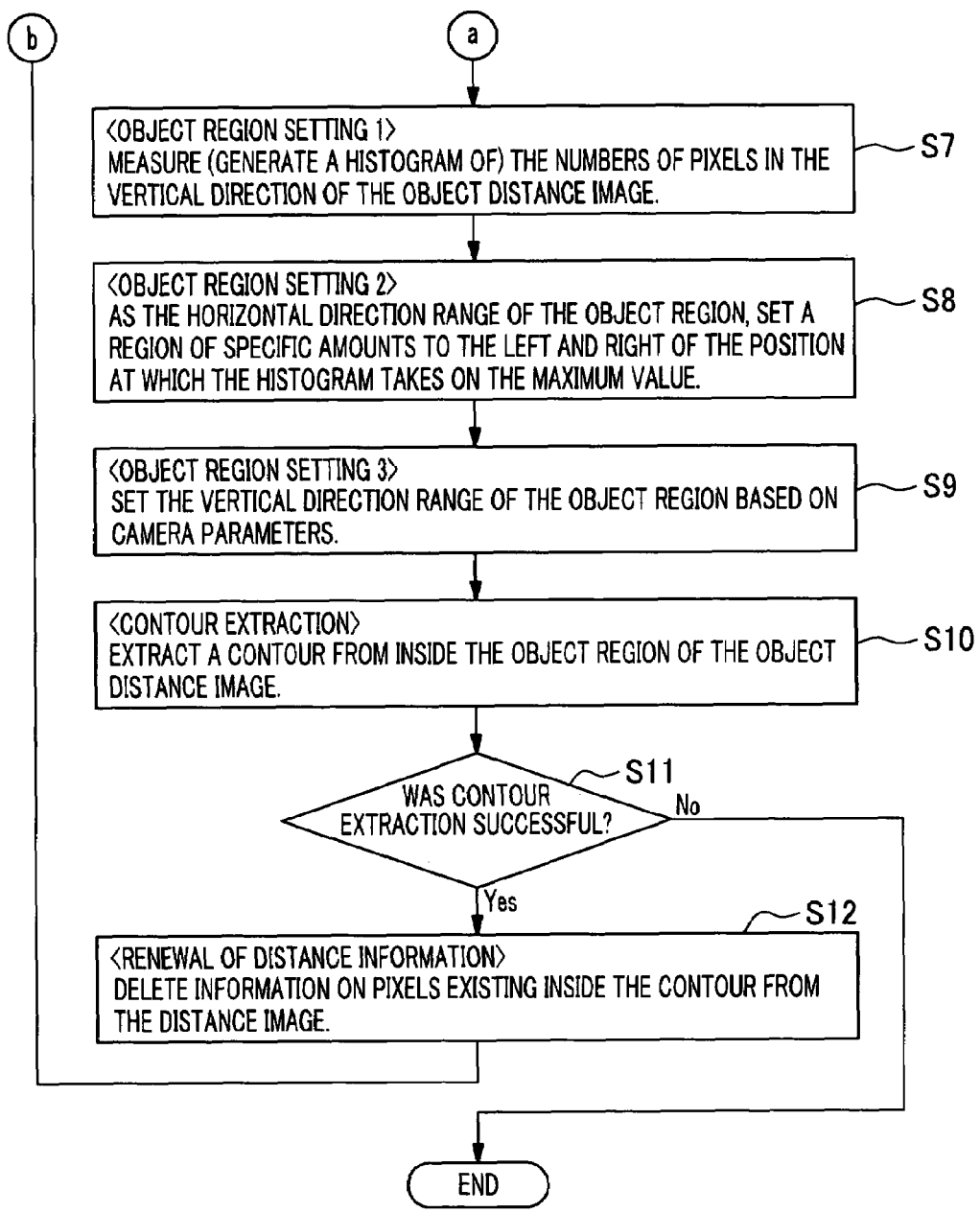
FIG. 3 is a flowchart (2/2) showing the operations of the moving object detection device that is the first embodiment of this invention.

The operations of moving object detection device 1 shall now be described with reference to FIG. 1 through FIG. 3. FIG. 2 and FIG. 3 are flowcharts showing the operations of moving object detection device 1.

<Camera Image Input Step>

First, moving object detection device 1 inputs camera images in time series from two cameras 2 that are synchronized (step S1). Here, the contour of a moving object shall be extracted based on camera images input from right camera 2a (reference camera) and left camera 2b at a certain t and a camera image input from right camera 2a (reference camera) at a subsequent time t+1 (for example, one frame later).

<Distance Image Generation Step>

Moving object detection device 1 generates, by means of distance information generating part 11, a distance image in which are embedded parallaxes (distances) to image-taken objects determined from the two camera images input at time t from right camera 2a (reference camera) and left camera 2b (step S2).

<Difference Image Generating Step>

Furthermore, moving object detection device 1, by means of movement information generating part 12, determines the differences of two camera images (reference camera images) taken by right camera 2a (reference camera) at time t and time t+1 and generates a difference image, wherein the pixel value of a pixel with which there is a difference is set to "1" and the pixel value of a pixel with which there is no difference is set to "0" (step S3).

<Object Distance Setting Step>

Also, moving object detection device 1, by means of object distance setting part 21 and based on the distance image and difference image generated in step S2 and step S3, totals the number of pixels with which there is movement according to each parallax (distance) expressed in the distance image (step S4). For example, just the pixels of a certain parallax (distance) are extracted from the distance image, and the pixel values of the pixels of the difference image that correspond to the extracted pixels are totaled. The distance for which the total number of pixels with movement (difference) is the greatest is then set as the object distance of a moving object to be detected (step S5).

<Object Distance Image Generating Step>

Moving object detection device 1 then generates, by means of object distance image generating part 22, an object distance image by extracting pixels corresponding to object distance±α from the distance image (step S6). Here, it shall be assumed that a person is to be detected and a is set to several dozen cm.

<Object Region Setting Step>

Then by means of object region setting part 23, moving object detection device 1 forms a histogram to measure the numbers of pixels in the vertical direction (up/down direction) of the object distance image generated in step S6 (step S7).

The range, centered about the horizontal position at which this histogram takes the maximum value (peak) and having a specific size (for example, 0.5 to 0.6 (m)) to the left and right, is then set as the horizontal direction range of an object region (step S8).

Furthermore, at object region setting part 23, the vertical (up/down) direction range of the object region is set based on the tilt angle, height from the floor (installation surface), and other camera parameters input from cameras 2 (step S9).

For example, based on the tilt angle and height from the floor of cameras 2, the position of the floor (bottom end of the object region) in the image of the object distance image is determined. Then based on the view angle and the distance to the moving object of cameras 2, a range of 2 m from the floor is converted into the number of pixels to determine the number of pixels from the floor of the object region in the object distance image. The top end of the object region in the object distance image can thus be determined. As this top end of the object region, the position (height) of 2 m in the image of the object distance image may be determined directly based on the tilt angle and height from the floor of cameras 2. This "2 m" is just an example and another length (height) may be used instead.

<Contour Extraction Step>

Also by means of contour extraction part 24, moving object detection device 1 extracts a contour inside the object region set in step S8 and step S9 in the object distance image generated in step S6 (step S10). For example, edges inside the object region are detected and a contour is extracted by applying the active contour model (SNAKES) to these edges.

Whether or not contour extraction was successful is then judged (step S11). Here, the judgment of success or failure of contour extraction may include not just the judgment of whether or not it was possible to extract a contour in step S10 but also the judgment of not performing contour extraction of an object, for example, due to the object distance being further away than a predetermined distance, the object region being smaller than a predetermined size, the contour extraction of all objects being completed, and other reasons.

If in step S11, it is judged that contour extraction was successful ("Yes"), step S12 is entered. On the other hand, if contour extraction has failed (or contour extraction is not performed) ("No"), the present operations are ended.

<Distance Information Renewal Step>

Moving object detection device 1 then renews, by means of distance information renewal part 25, the distance image in accordance with the interior of the contour (internal region including the contour) that was extracted in step S10 (step S12). For example, the pixel values of the distance image that correspond to the internal region including the contour are set to "0." The region of the moving object for which extraction has been completed is thereby deleted from the distance image. A return to step S4 is then performed to continue with the processes.

By means of the respective steps described above, moving object detection device 1 of the present embodiment enables the detection, from camera images input from cameras 2, of moving objects existing in the camera images. Also, though here the contour of a moving object at time t (t+1) was extracted, by making the operations of the above-described steps (step S1 to step S12) be performed based on camera images that are input from time to time, a moving body, such as a moving robot, etc., can continue to detect a person.

As described above, with this invention, based on a distance image (distance information), generated from camera images taken by a plurality of cameras, and on a difference image (movement information), generated from camera images input in time series, the distance from the cameras to a moving object with movement can be specified and an image (object distance image) based on just this distance can be generated. Moving objects that are connected in a camera image (for example, persons, etc.) can thus be detected as separate moving objects by identification and separation according to distance. Also by this invention, since the horizontal direction range of a moving object can be narrowed down based on the amounts of moving object pixels in the vertical direction in the object distance image, a plurality of moving objects existing side-by-side at the same distance can be detected as separate moving objects.

[Second Embodiment]

(Arrangement of a Moving Object Detection Device)

Figure 10:
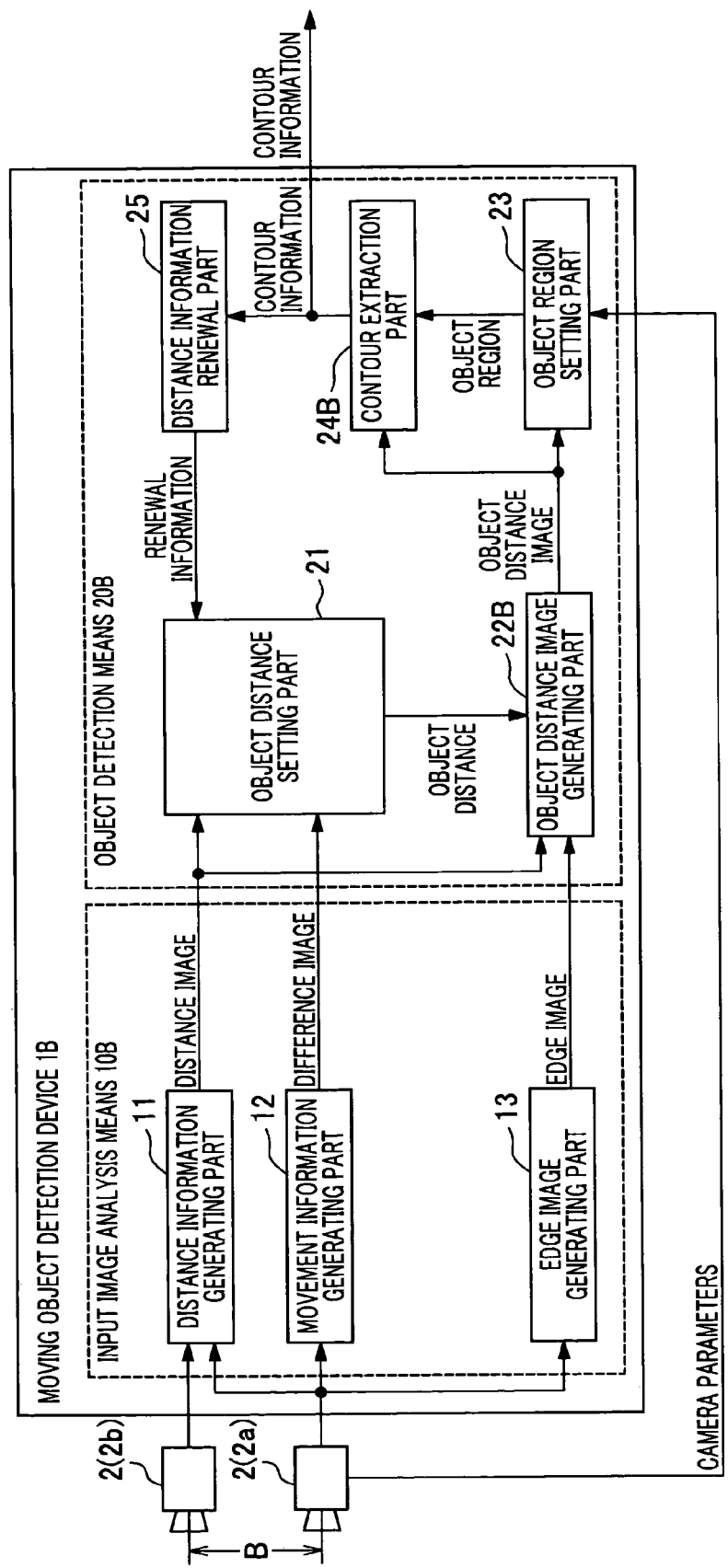
FIG. 10 is a block diagram showing the overall arrangement of a moving object detection device that is a second embodiment of this invention.

The arrangement of a moving object detection device 1B, which is a second embodiment of this invention, shall now be described with reference to FIG. 10. FIG. 10 is a block diagram showing the arrangement of moving object detection device 1B. As shown in FIG. 10, moving object detection device 1B detects objects with movement (moving objects) from camera images (taken images) taken by two cameras (image pickup means) 2.

Here, moving object detection device 1B is arranged from an input analysis means 10B, comprising a distance information generating part 11, a movement information generating part 12, and an edge image generating part 13, and an object detection means 20B, comprising an object distance setting part 21, an object distance image generating part 22B, an object region setting part 23, a contour extraction part 24B, and a distance information renewal part 25. The components besides edge image generating part 13, object distance image generating part 22B, and contour extraction part 24B are the same as those shown in FIG. 1 and are thus provided with the same symbols and description thereof shall be omitted.

Edge image generating part (edge image generating means) 13 inputs a camera image (reference taken image) of the same time as that input from a camera 2 (2a) into distance information generating part 11 and movement information generating part 12 and generates an edge image resulting from the extraction of edges from this camera image. With this edge image generating part 13, based on the brightness (luminance: gray scale information) of the camera image input from a camera 2 (2a), parts at which the brightness changes greatly are detected as edges and an edge image made up just such edges is generated. For example, edges are detected by multiplying each pixel by an operator, having weight factors for pixels in the vicinity regions of certain pixels (a factor array, such as a Sovel operator, Kirsch operator, etc.).

Figure 13:
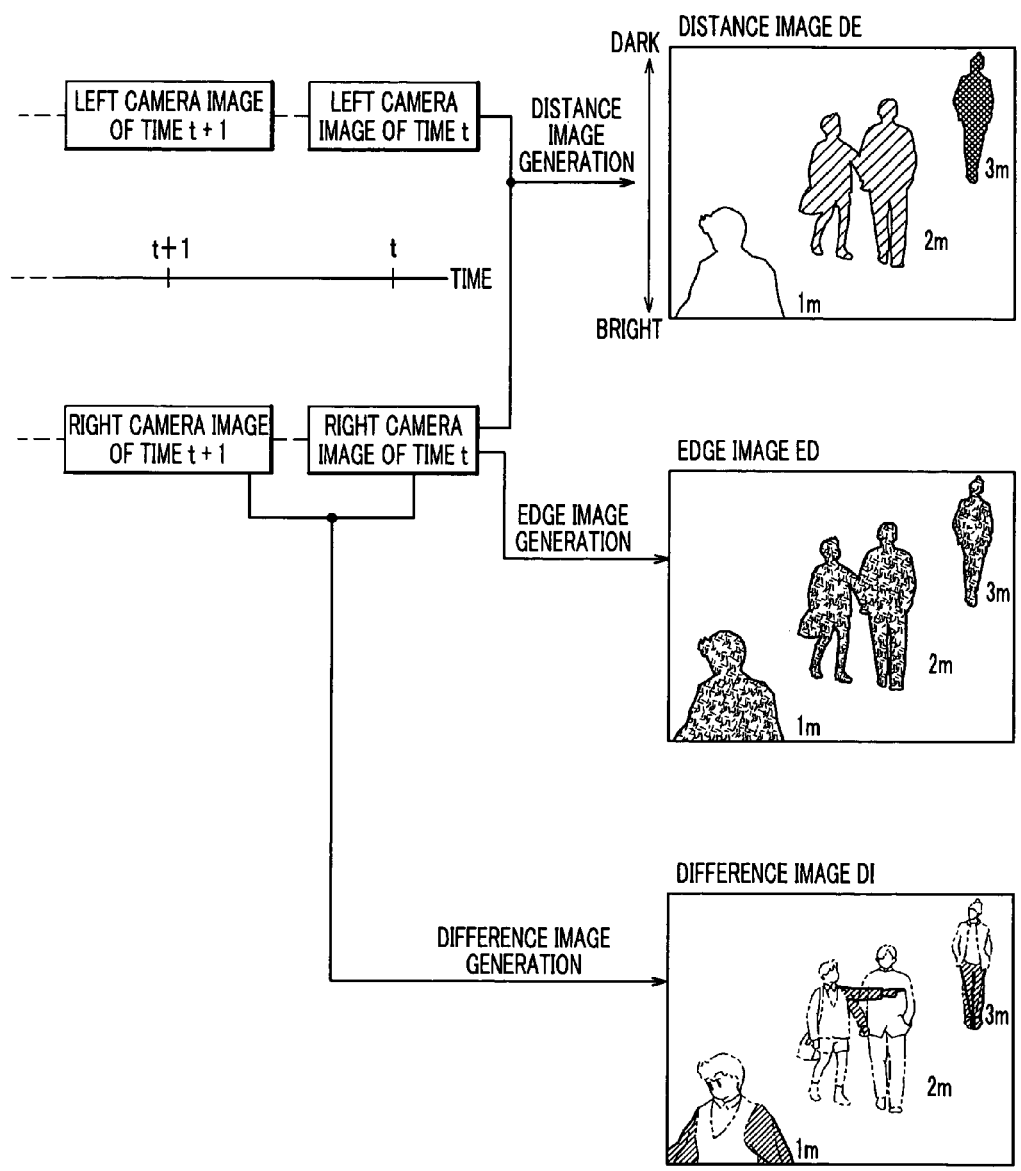
FIG. 13 is a diagram showing an example of the contents of a distance image, a difference image, and an edge image.

Thus with input image analysis means 10B, a distance image DE, in which the parallaxes of the right camera image and the left camera image at time t are expressed as pixel values, an edge image ED, resulting from the extraction of edges from the right camera image at time t, and a difference image DI, obtained by determining the differences of the right camera image at time t and the right camera image at time t+1 and expressing pixels with which there is a difference with the pixel value "1" and pixels with which there is no difference with the pixel value "0," are generated as shown in FIG. 13B. With edge image generating part 13, in the case where the camera images are color images and persons are to be specified as moving objects, edges may be detected, for example, by detecting the color of an uncovered facial region, etc. of a person (skin tone) as color information.

Object distance image generating part (object distance image generating means) 22B generates an object distance image made up of pixels corresponding to the object distance set at object distance setting part. With this object distance image generating part 22B, first, the pixel positions corresponding to the object distance±α (in a case where it is presumed that persons are to be detected this a is set to a few dozen cm) notified from object distance setting part 21, are determined from the distance image, which is generated at distance information generating part 11 and in which parallax amounts are embedded. Just the pixels corresponding to these pixel positions are then extracted from the edge image generated at edge image generating part 13 and generate an object distance image. This object distance image will thus be an image in which moving objects existing at the object distance are expressed by edges.

Contour extraction part (contour extraction means) 24B performs, from the object distance image generated at object distance image generating part 22B, the extraction of a contour inside a moving object region (object region) set at object region setting part 23. The contour (contour information) that is extracted here is output to the exterior as an output of moving object detection device 1B and also notified to distance information renewal part 25. By a contour being extracted by contour extraction part 24B, it is deemed that a moving object has been detected.

With this contour extraction part 24B, since the object distance image generated at object distance image generating part 22B is already expressed by edges, contours are extracted from these edges using an active contour model (SNAKES), etc. The edge detection that was performed at contour extraction part 24 (FIG. 1) can thus be omitted at contour extraction part 24B.

The arrangement of moving object detection device 1B, which is the second embodiment, has been described above, and with moving object detection device 1B, the respective means may be realized in a computer as corresponding functional programs and the respective functional programs may be joined together to operate as a moving object detection program.

Also with moving object detection device 1B, distance information generating part 11 may be arranged to generate a distance image using three or more cameras. In this case, movement information generating part 12 and edge image generating part 13 generates a difference image and an edge image based on camera images input form the camera that is the reference camera.

Furthermore, moving object detection device 1B may be incorporated in a moving robot, automobile, or other moving body and used to detect persons and other objects.

(Operations of Moving Object Detection Device 1B)

Figure 11:
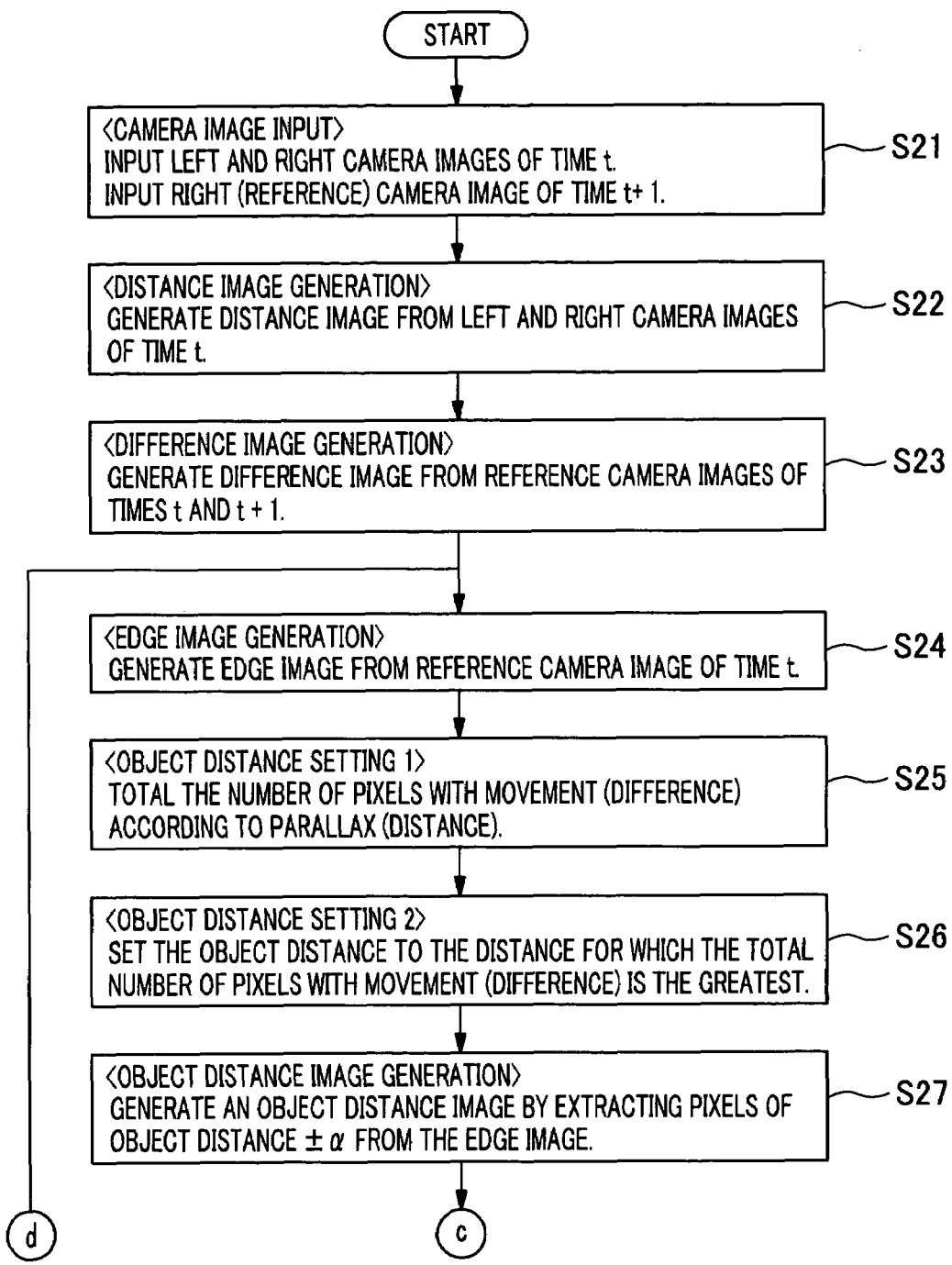
FIG. 11 is a flowchart (1/2) showing the operations of the moving object detection device that is the second embodiment of this invention.
Figure 12:
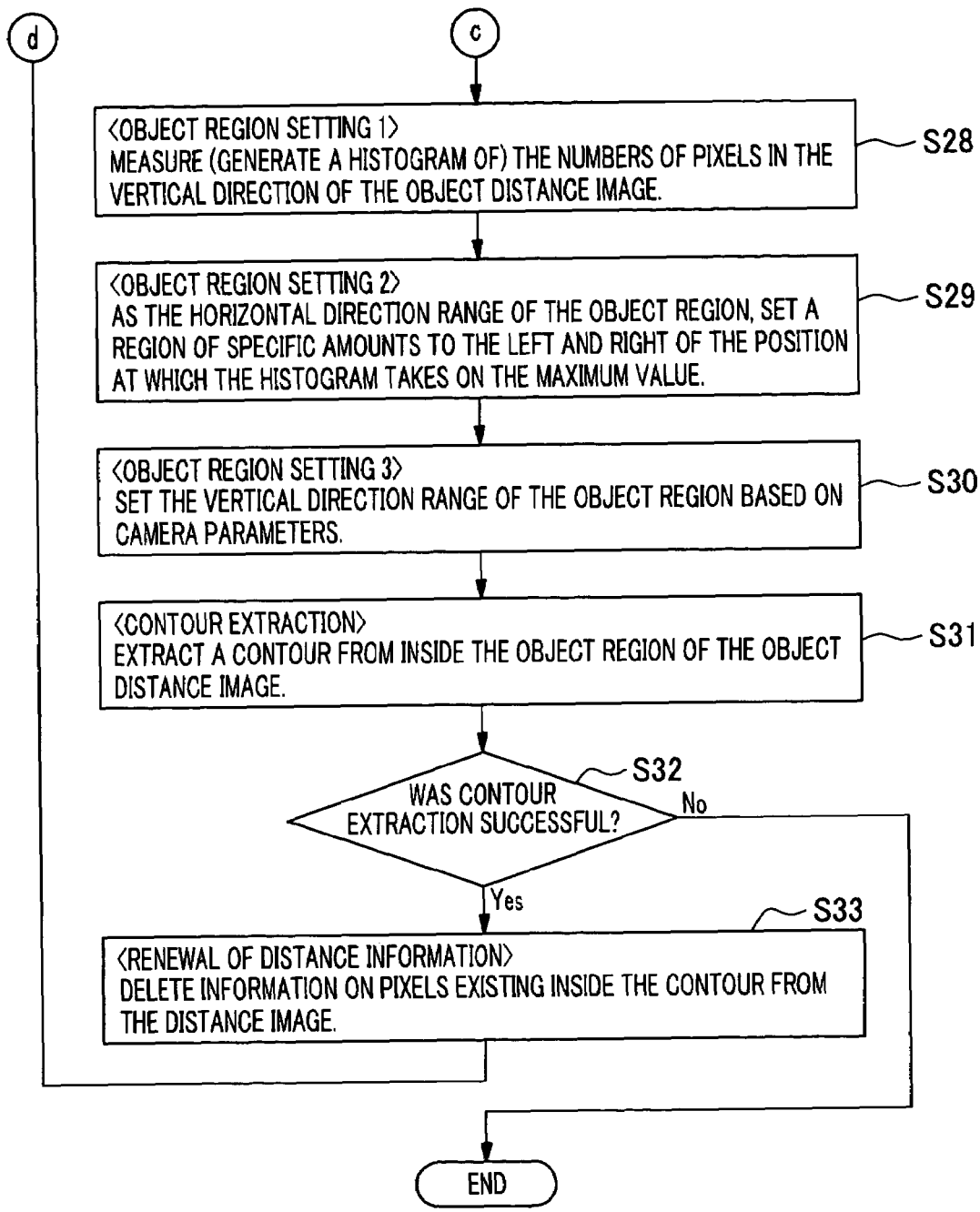
FIG. 12 is a flowchart (2/2) showing the operations of the moving object detection device that is the second embodiment of this invention.

The operations of moving object detection device 1B shall now be described briefly with reference to FIG. 10, FIG. 11, and FIG. 12. FIG. 11 and FIG. 12 are flowcharts showing the operations of moving object detection device 1B.

First, moving object detection device 1B inputs camera images in time series from two cameras 2 that are synchronized (step S21). Then by means of distance information generating part 11, a distance image is generated in which are embedded parallaxes (distances) to image-taken objects determined from the two camera images input at time t from right camera 2a (reference camera) and left camera 2b (step S22). Furthermore, by means of movement information generating part 12, the differences of two camera images (reference camera images) taken by right camera 2a (reference camera) at time t and time t+1 are determined, and a difference image, wherein the pixel value of a pixel with which there is a difference is set to "1" and the pixel value of a pixel with which there is no difference is set to "0," is generated (step S23). Then by means of edge image generating part 13, an edge image, resulting from the extraction of edges from the camera image (reference camera image) taken at time t by right camera 2a (reference camera) is generated (step S24).

Also, moving object detection device 1B, by means of object distance setting part 21 and based on the distance image and difference image generated in step S22 and step S23, totals, for each parallax (distance) expressed in the distance image, the values of the pixels of the difference image that are at the same positions as the pixels corresponding to each parallax (step S25). The distance for which the total number of pixels with movement (difference) is the greatest is then set as the object distance of a moving object to be detected (step S26). Then by means of object distance image generating part 22B, an object distance image, with which pixels corresponding to object distance±α are extracted from the edge image, is generated (step S27). Here, it shall be assumed that a person is to be detected and α is set to several dozen cm.

Then by means of object region setting part 23, moving object detection device 1B forms a histogram to measure the numbers of pixels in the vertical direction (up/down direction) of the object distance image generated in step S27 (step S28). The range, centered about the horizontal position at which this histogram takes the maximum value and having a specific size (for example, 0.5 to 0.6 (m)) to the left and right, is then set as the horizontal direction range of an object region (step S29). Furthermore, the vertical direction range of the object region is set based on the tilt angle, height from the floor (installation surface), and other camera parameters input from cameras 2 (step S30).

Also by means of contour extraction part 24B, moving object detection device 1B extracts a contour inside the object region set in step S29 and step S30 in the object distance image generated in step S27 (step S31), and then whether or not contour extraction was successful is judged (step S32). If in step S32, it is judged that contour extraction was successful ("Yes"), step S33 is entered. On the other hand, if contour extraction has failed (or contour extraction is not performed) ("No"), the present operations are ended.

Then by means of distance information renewal part 25, moving object detection device 1B generates, as renewal information, the pixel positions corresponding to the interior of the contour (internal region including the contour) that was extracted in step S31, and object distance setting part 21 performs deletion of information in the distance image based on the renewal information (step S33). The region of the moving object for which extraction has been completed is thereby deleted from the distance image. A return to step S25 is then performed to continue with the processes.

By means of the respective steps described above, moving object detection device 1B of the present embodiment enables the detection, from camera images input from cameras 2, of moving objects existing in the camera images. Also, with moving object detection device 1B, since an edge image is generated in step S24 and an object distance image, with which edges have been detected already, is used for the extraction of a contour in step S31, the extraction of a contour can be performed at high speed even when a plurality of moving objects (persons, etc.) exist in an aligned manner at the same distance.

As described above, with this invention, since an edge image, resulting from the extraction of edges from a camera image, is generated in advance, there is no need to detect edges in the process of performing contour extraction on each individual moving object region (object region). Thus even if a plurality of moving objects exist in a joined manner in a camera image, since the extraction of edges is not performed on overlapping regions, moving objects can be detected at high speed.

[Third Embodiment]

[Arrangement of the Moving Object Detection Device]

Figure 14:
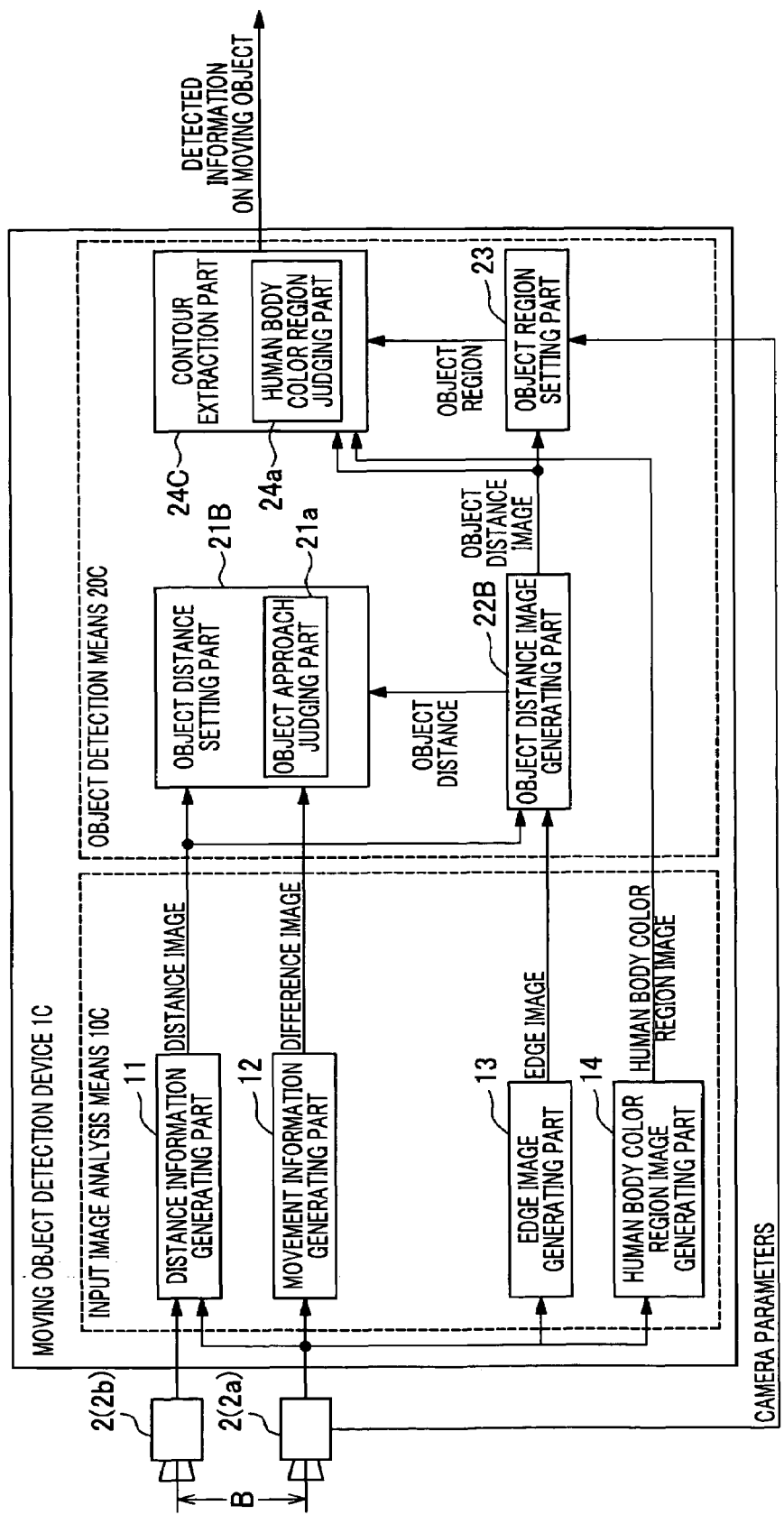
FIG. 14 is a block diagram showing the overall arrangement of a moving object detection device that is a third embodiment of this invention.

The arrangement of a moving object detection device 1C that is a third embodiment of this invention shall now be described with reference to FIG. 14. FIG. 14 is a block diagram showing the arrangement of moving object detection device 1C. As shown in FIG. 14, moving object detection device 1C detects objects with movement (moving objects) from camera images (taken images) taken by two cameras (image pickup means) 2. Here, moving object detection device 1C is arranged from an input image analysis means 10C, which analyzes the input camera images, and an object detection means 20C, which detects objects from the analyzed camera images. The two cameras 2 are positioned apart to the left and right by just a distance B and these shall be referred to respectively as right camera 2a and left camera 2b.

Input image analysis means 10C analyzes camera images (taken images) that are input synchronously from the two cameras 2 (image pickup means 2a and 2b) that take image-taken objects and generates a distance image, containing distance information, a difference image, containing movement information, an edge image, resulting from the extraction of edges, and a skin tone region image, resulting from the extraction of skin tone regions. Here input image analysis means 10C is arranged from a distance information generating part 11, a movement information generating part 12, an edge image generating part 13, and a skin tone region image generating part 14.

Distance information generating part (distance information generating means) 11 embeds the parallaxes of two camera images, taken by right camera 2a and left camera 2b at the same time, as the distance information on the distances from cameras 2 to the image-taken objects taken by cameras 2 (to be more accurate, the distances from the focal point position of cameras 2) and thereby generates a distance image. This distance image generating part 11 inputs camera images, for example, at a rate of one frame at each 100 ms interval.

With this distance information generating part 11, right camera 2a is used as a reference camera (reference image pickup means) and by performing block matching with a block of specific size (for example, 8×3 pixels) on the camera image (reference taken image) taken by the reference camera (right camera 2a) and the camera image (simultaneously-taken image) taken by left camera 2b, the parallaxes with respect to the reference taken image are measured. A distance image, in which the magnitudes of the parallaxes (parallax amounts) are made to correspond to the respective pixels of the reference taken image, is then generated.

Here, when a parallax is Z, the distance D (not shown) to an object from cameras 2 corresponding to this parallax Z can be determined by the above-described Formula (1), wherein f (not shown) is the focal distance of cameras 2 and B is distance between right camera 2a and left camera 2b.

Movement information generating part (movement information generating means) 12 generates a difference image in which the movements of moving objects within a camera image are embedded as movement information based on the differences of two camera images taken in time series by the reference camera (right camera 2a).

At this movement information generating part 12, right camera 2a is deemed to be the reference camera (reference image pickup means) and the differences of two camera images taken at different times by this reference camera (right camera 2a) are determined. For example, when a camera image is input at a 100 ms interval, a camera image delayed by $\Delta t$ (for example, 33 ms) from the input time is input and the differences of these two camera images are determined.

A difference image is then generated in which a pixel with which there is a difference is regarded as a pixel with which there is movement and is provided with a pixel value of "1" while a pixel with which there is no difference is regarded as a pixel with which there is no movement and is provided with a pixel value of "0." Also at movement information generating part 12, the difference image is eliminated of noise by being subject to a filtering process using a median filter, etc.

In a case where cameras 2 are arranged as moving cameras and the background inside the camera images that are taken changes, the pan, tilt, and other camera movement amounts are input according to each camera image from cameras 2, and for example by correcting a camera image at time $t+\Delta t$ by the camera movement amounts, just the pixels with which there is movement at time t and time $t+\Delta t$ are detected.

Edge image generating part (edge image generating means) 13 inputs a camera image (reference taken image) from a camera 2 (2a) and generates an edge image resulting from the extraction of edges from this camera image. With this edge image generating part 13, based on the brightness (luminance: gray scale information) of the camera image input from camera 2 (2a) parts at which the brightness varies greatly are detected as edges and an edge image made up just such edges is generated. For example, edges are detected by multiplying each pixel by an operator, having weight factors for pixels in the vicinity regions of certain pixels (a factor array, such as a Sovel operator, Kirsch operator, etc.).

Human body color region image generating part 14 inputs a camera image (reference taken image) from a camera 2 (2a) and extracts regions of skin tone from the camera image. With this skin tone region image generating part 14, the RGB values of all pixels in the input camera image are converted into HLS space of hue, lightness, and saturation and pixels, with which the hue, lightness, and saturation fall within ranges of threshold values that have been set in advance as skin tone ranges, are extracted as skin tone regions.

Figure 18:
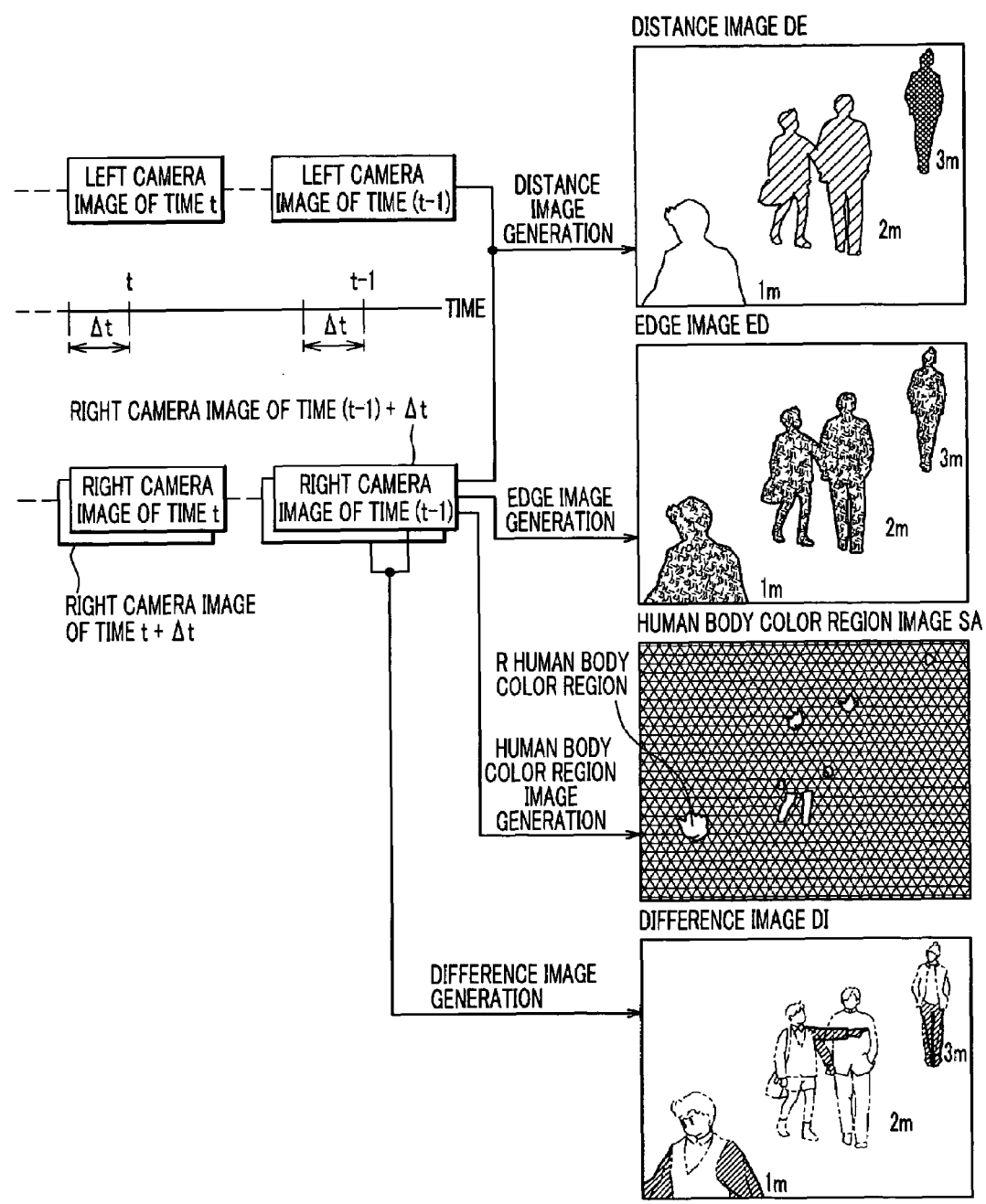
FIG. 18 is a diagram showing an example of the contents of a distance image, an edge image, a skin tone region and a difference image.

The distance image generated by distance information generating part 11, the difference image generated by movement information generating part 12, the edge image generated by edge image generating part 13, and the skin tone region image generated by skin tone region image generating part 14 shall now be described with reference to FIG. 18 (and with reference to FIG. 14 where necessary). FIG. 18 shows the manner in which the respective images are generated based on camera images that are input in time series.

As shown in FIG. 18, a distance image DE is generated by expressing the parallaxes of the right camera image and the left camera image of the same time as pixel values. The greater the value of this parallax, the closer the position of the corresponding person to cameras 2 and the smaller the value of this parallax, the further the position of the corresponding person from cameras 2. An edge image ED is an image generated from a right camera image and is made up of just the detected edges. As with edge image ED, a skin tone region image SA is an image generated from the right camera image and is an image resulting from the extraction of regions of skin tone (skin tone regions R). Also, difference image DI is generated by determining the differences of two right camera images that were input at times differing by just $\Delta t$ (for example, right camera images taken at time t and at time $t+\Delta t$) and expressing pixels with which there is a difference by a pixel value of "1" and pixels with which there is no difference with a pixel value of "0." Pixels for which this difference exists express regions in which persons are actually moving.

Figure 19A:
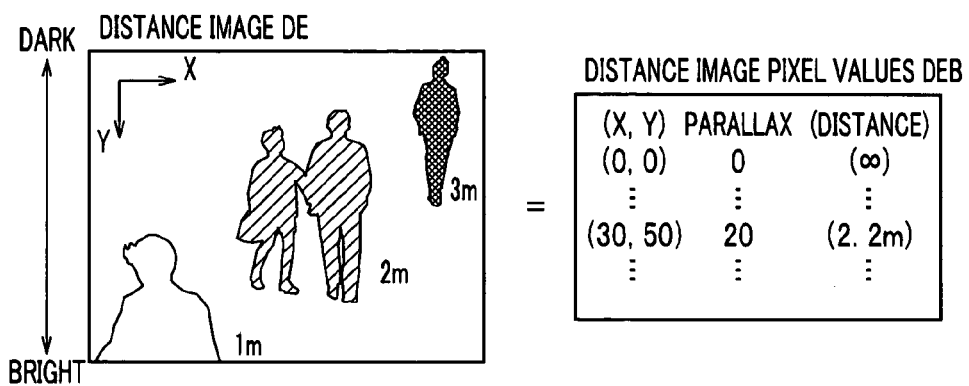
FIG. 19A is a diagram showing the contents of the distance image and an example of the pixel values thereof (distance image pixel values).
Figure 19B:
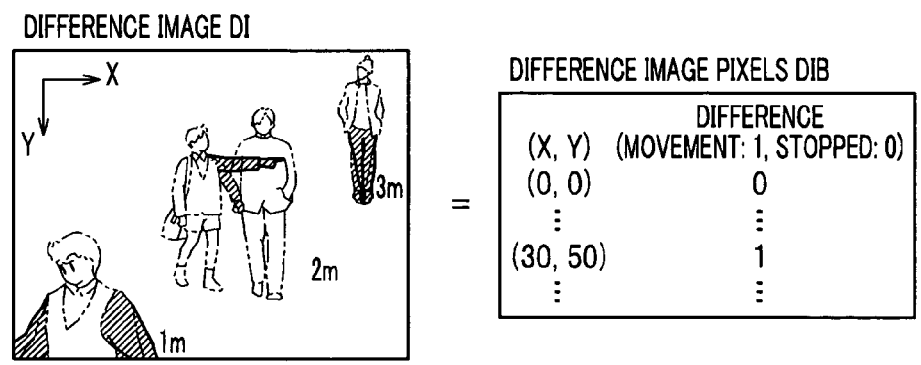
FIG. 19B is a diagram showing the contents of the difference image and an example of the pixel values thereof (difference image pixel values).

FIG. 19 shall now be referenced to describe the contents of distance image DE and difference image DI in more detail. FIG. 19A is a diagram showing an example of the image contents of a distance image DE and the pixel values thereof (distance image pixel values DEB). FIG. 19B is a diagram showing an example of the contents of a difference image DI and the pixel values thereof (difference image pixel values DIB). Here, it shall be deemed that persons exist at positions approximately 1 m, 2 m, and 3 m away from cameras 2.

As shown in FIG. 19A, distance image DE expresses, by the pixel values, the parallaxes of a right camera image and a left camera image of the same time as pixel values, and for example, as indicated by distance image pixel values DEB, for the pixel position (0, 0) of distance image DE, the parallax is 0, thus indicating that the distance of this pixel position from cameras 2 is infinity ($\infty$). Also, for the pixel position (30, 50) of distance image DE, the parallax is 20, thus indicating that the distance of this pixel position from cameras 2 is a distance corresponding to a parallax of 20, for example, 2.2 m. Since distance image DE thus expresses the parallaxes as pixel values, the image is one with which an object is shown as being brighter the closer it is to cameras 2 and as being darker the further away it is from cameras 2.

As shown in FIG. 19B, difference image DI expresses the existence or non-existence of differences in right camera images input in time series, and for example, as indicated by difference image pixel values DIB, the value for pixel position (0, 0) of difference image DI is "0," which indicates a "stopped" state and thus signifies that there is no movement. Also, the value for pixel position (30, 50) of difference image DI is "1," which indicates "movement" and thus signifies that there is movement.

The description shall now be continued with reference again to FIG. 14.

Object detection means 20C detects a region of a moving object with movement based on the images (distance image, difference image, edge image, and skin tone region image) analyzed by input image analysis means 10C and extracts the contour of the moving object. Here, moving object detection means 20C is arranged from an object distance setting part 21B, an object distance image generating part 22B, an object region setting part 23, and a contour extraction part 24C.

Object distance setting part (object distance setting means) 21B specifies a moving object with the greatest movement amount based on the distance image generated at distance information generating part 11 of input image analysis means 10C and the difference image generated at movement information generating part 12 and sets the object distance at which the moving object to be subject to detection exists. This object distance is notified to object distance image generating part 22B. Here, object distance setting part 21B is equipped with an object approach judging part 21a so that detection is performed only in cases where moving objects are approaching cameras 2.

Object approach judging part 21a judges whether or not moving objects are approaching or not based on distance images input in time series from distance information generating part 11. For example, if with the distance image pixel values DEB of distance image DE shown in FIG. 19, the parallaxes increase, it is judged that the corresponding moving objects are approaching.

At this object distance setting part 21B, when moving objects are recognized as approaching, for each parallax (distance) expressed in the distance image, the values of the pixels of the difference image at the same positions as the pixels corresponding to the parallax are totaled, and a moving object of the greatest movement amount is judged to exist at the parallax (highest-total parallax) for which the total is the highest.

Also, here a depth of $\pm\alpha$ with respect to the object distance corresponding to the highest-total parallax is set as the distance range in which a moving object of the greatest movement amount exists. This value of a indicates the range in the depth direction, with the object distance as a reference. Here, the value of a is set to a difference in distance images input in time series from distance information generating part 11, for example, to a difference between the distance image generated at time t−1 and the distance image generated at time t. Also, it may be assumed that persons are to be detected and a fixed value of several dozen cm may be used as the value of $\alpha$ instead.

It shall be deemed that object distance setting part 21B stores the distance image generated by distance information generating part 11 and the difference image generated by movement information generating part 12 in an unillustrated memory or other storage means.

Object distance image generating part (object distance image generating means) 22B generates, based on the distance image, which was generated at distance information generating part 11 and in which parallax amounts are embedded, an object distance image, with which pixels corresponding to the object distance set at object distance setting part 21B are extracted from the edge image generated at edge image generating part 13.

For example, if the distance from cameras 2 to a moving object for the highest-total parallax is D, the focal distance of cameras 2 is f, the distance between right camera 2a and left camera 2b is B, and the range in the depth direction of the object subject to detection is α, the range Zr of the parallax can be expressed by the above-described Formula (2).

Here, an object distance image, obtained by extracting the pixels corresponding to parallaxes of the range defined by the above-described Formula (2) from the edge image, is generated at this object distance image generating part 22B. For the generation of this object distance image, pixels of just pixel positions corresponding to the object distance (parallax range) may be extracted from the camera image (original image) taken by the reference camera (right camera 2a) or from the distance image generated at distance information generating part 11.

Figure 20A:
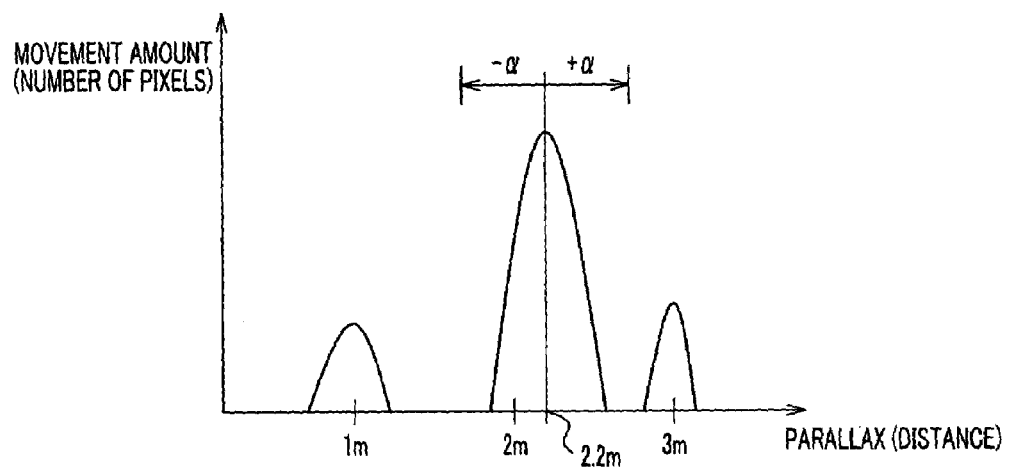
FIG. 20A is a graph showing the relationship between the parallax (distance) and the movement amount (number of pixels) determined by totaling pixels with which there is movement.
Figure 20B:
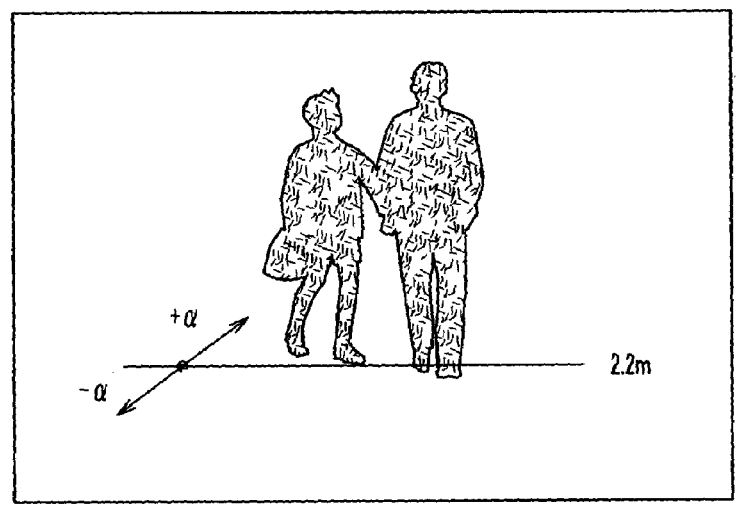
FIG. 20B is a diagram showing an object distance image obtained by extracting just the image of the object distance from the edge image.

The procedure by which the image (object distance image) corresponding to the distance at which a moving object that is subject to detection exists is generated at object distance setting part 21B and object distance image generating part 22B shall now be described with reference to FIG. 20 (and with reference to FIG. 14 where necessary). FIG. 20A is a graph showing the relationship, based on distance image DE and difference image DI (FIG. 19), between the parallax (distance) and the movement amount (number of pixels) determined by totaling pixels with which there is movement. FIG. 20B shows an object distance image TDE obtained by extracting just the image of the object distance from edge image ED (FIG. 18).

When as shown in FIG. 20A, the relationship between the parallax (distance) of distance image DE (FIG. 19) and the movement amount (number of pixels) is expressed by a graph, the movement amount peaks at parallax (distance) positions of 1 m, 2.2 m, and 3 m. Thus object distance setting part 21B deems that a moving object exists at the parallax (2.2 m) at which the movement amount is the greatest and judges that a moving object exists within a depth range to the front and rear ($\pm\alpha$) of this parallax (2.2 m). The a is a difference in distance image input in time series from distance information generating part 11. With regard to the value of a, it may be assumed that a moving object is a person and it can be judged that a person exists in the range of 2.2±αm (α=0.5 m) from cameras 2.

Also as shown in FIG. 20B, object distance image generating part 22B judges the pixel positions that are to be subject to detection based on the distance image generated at distance information generating part 11 and generates object distance image TDE, with which pixels existing at the object distance ±αm are extracted from the edge image generated at edge image generating part 13. The images of persons existing at positions 1 m and 3 m way from cameras 2 are thus deleted to generate object distance image TDE, with which just the persons existing at a position 2.2±αm away are extracted as the edge image.

The description shall now be continued with reference to FIG. 14 again.

Object region setting part (object region setting means) 23 totals the numbers of pixels in the vertical direction of the object distance image (edge image corresponding to the object image), generated at object distance image generating part 22, specifies the position (peak) at which the total number of pixels in the vertical direction is the greatest as the horizontal position of the center of a moving object, and thereby sets a region (object region) that contains the moving object.

With this object region setting part 23, it is assumed, for example, that a moving object is a person and in the case where the movement direction of a person is such that the person is moving while facing towards cameras 2, the horizontal direction range of the object range is set to a width suited to the width of a person. In other cases, for example in a case where a person is approaching in a diagonal direction, the horizontal direction of the object region is set to a narrowed range. This is because in the case where a person is facing diagonally, detection may be performed with the horizontal direction range being set to less than or equal to the shoulder width of a person.

Also for the vertical direction, object region setting part 23 sets a specific size (for example 2 m) as the height of the object region. In this process, object region setting part 23 sets the existence region (range) in the vertical direction of the object region based on camera parameters, such as tilt angle, height from the floor (installation surface), etc., that are input from cameras 2.

Figure 21:
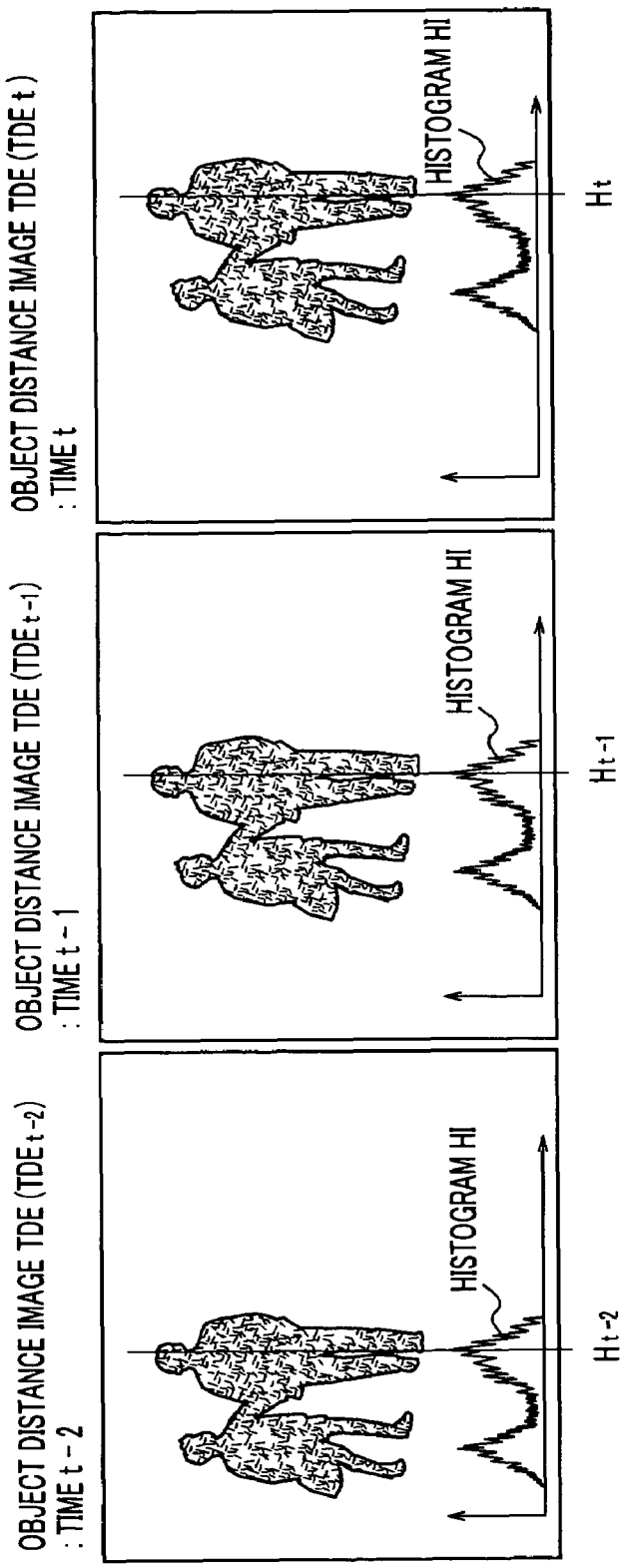
FIG. 21 is diagrams showing, by means of histograms, the positions in the object distance images at which the total number of pixels in the vertical direction is the greatest.
Figure 22:
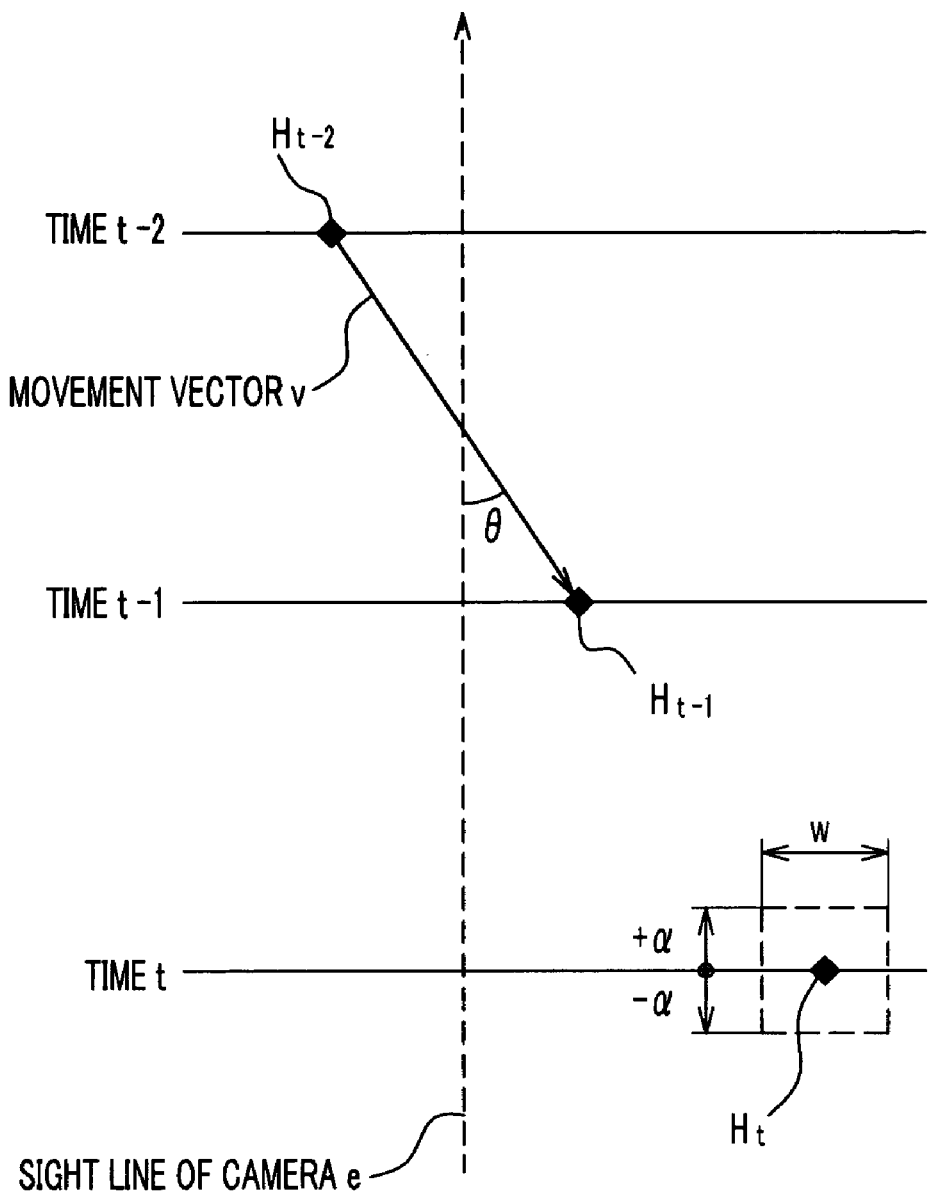
FIG. 22 is an explanatory diagram for describing the procedure for setting an object region in accordance with the variation of the histogram peak position.

The procedure, by which object region setting part 23 sets the region (object region) of one moving object (one person) from inside object distance image TDE, shall now be described with reference to FIG. 21 and FIG. 22 (and with reference to FIG. 14 where necessary). FIG. 21 expresses, by histograms H1, the totals of the number of pixels in the vertical direction in object distance image TDE (TDE$_{t-2}$) generated at object distance generating part 22B at time t−2, object distance image TDE (TDE$_{t-1}$) generated at time t−1, and object distance image TDE (TDE$_t$) generated at time t. Though in FIG. 21, histograms H1 are overlapped onto object distance images TDE (TDE$_{t-2}$, TDE$_{t-1}$, TDE$_t$), this overlapping is done only for the sake of description. FIG. 22 shows the variation of the histogram peak position from time t−2 to time t, that is, the variation of the position of the moving object. With FIG. 22, the object distance image is viewed in a virtual manner from above.

Object region setting part 23 generates histogram HI by totaling the numbers of pixels in the vertical direction of object distance image TDE as shown in FIG. 21. By thus generating a histogram of object distance image TDE, it becomes possible to judge that the horizontal position of the center of a moving object exists at the position at which the value of histogram HI is the highest. For example, if histogram HI is not used and the position of the pixel of a value that is not 0 that exists at the highest position in object distance image TDE is judged to be the horizontal position of the center of a moving object, in a case where a person raises his/her hand, the tip of this hand will be judged to be at the center of the person (moving object). Histogram HI is thus used here.

Here, in object distance image TDE (TDE$_{t-2}$) of time t−2, the center of a moving object (the person at the right) exists at the horizontal position H$_{t-2}$, at which histogram HI takes on the maximum value, in object distance image TDE (TDE$_{t-1}$) of time t−1, the center of the moving object (person at the right) exists at the horizontal position H$_{t-1}$, at which histogram HI takes on the maximum value, and in object distance image TDE (TDE$_t$) of time t, the center of the moving object (person at the right) exists at the horizontal position H$_t$, at which histogram HI takes on the maximum value. By thus judging the position at which the histogram takes on the maximum value as the center of a moving object, even when a plurality of moving objects (persons, etc.) exist at the same distance, just one of those objects (one person) can be detected.

Then as shown in FIG. 22, object region setting part 23 specifies the movement direction of the moving object based on the vector (movement vector v) from the center position H$_{t-2}$ moved of the moving object at time t−2 to the center position H$_{t-1}$ of the moving object at time t−1. Based on this movement direction, object region setting part 23 sets the horizontal direction range w of the object region at time t. The range α in the depth direction is already set as was shown in FIG. 20.

In this setting of the horizontal direction range w, object region setting part 23 judges, for example, that when the angle θ formed by movement vector v and the sight line e of the camera is less than 45°, the moving object (person) is approaching rapidly and sets the horizontal direction range to the person's central position H$_t$±(0.5 to 0.6) m. Also, when the angle θ is 45° or more, object region setting part 23 judges that the moving object (person) is moving across the front of the camera and sets the horizontal direction range to the person's central position H$_t$±(0.2 to 0.3) m. The angle θ formed by movement vector v and camera sight line e may be divided more finely and a horizontal direction range w may be set for each of the divided angles in advance.

Furthermore, object region setting part 23 sets a specific size (for example, 2 m) as the vertical direction range of the object region. Since the method of measuring the size of this object region is the same as the method described with FIG. 7, the description thereof shall be omitted.

The description shall now be continued with reference again to FIG. 14.

Contour extraction part (contour extraction means) 24C performs, within the moving object region (object region) set by object region setting part 23 in the object distance image generated by object distance image generating part 22B, the extraction of a contour of the moving object using a known contour extraction art.

Here, as the known art of contour extraction, for example, the active contour model called snakes may be used. Here, snakes refers to the method of extracting the contour of an object by reducing and deforming a closed curve so as to minimize a predefined energy. Here, since the initial value for calculating the energy can be set inside the moving object region (object region), the calculation amount for contour extraction can be lightened.

Furthermore, contour extraction part 24C may be equipped with a skin tone region judging part 24a that judges whether or not the moving object with which the contour has been extracted is a person.

Human body color region judging part 24a judges whether or not the contour of the moving object extracted in contour extraction part 24C is the contour of a person. With this skin tone region judging part 24a, when the contour of a moving object that is approaching has been extracted, whether or not a skin tone region R (see FIG. 18) of the skin tone region image generated at skin tone region image generating part 14 is included in the contour is judged to judge whether or not the contour is the contour of a person.

Figure 23:
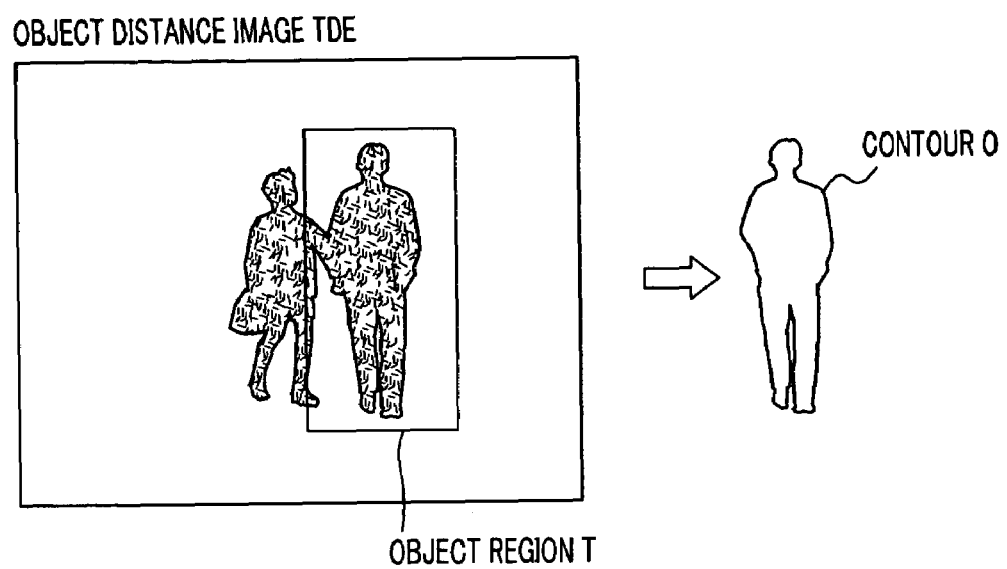
FIG. 23 is a diagram showing an example of extraction of a contour from the object region of the object distance image.

Contour extraction part (contour extraction means) 24C outputs, to the exterior, the detected information (center of gravity of the moving object, movement direction (angle) of the moving object) on the moving object inside the contour. Here, it is deemed that only persons are to be detected, and if it is judged at skin tone region judging part 24 that a contour is not that of a person, the detected information on the moving object is not output to the exterior. By a contour being thus extracted by contour extraction part 24C, it is deemed that a moving object has been detected. A contour O can thus be extracted from inside object region T, with which moving objects have been restricted to one object (one person) inside object region image TDE, as shown for example in FIG. 23.

The above-described moving object detection device 1C may be incorporated in a moving robot, automobile, or other moving body and used to detect persons and other objects. For example, by applying the present invention to a moving robot, the moving robot may be made to recognize persons even in a crowd. Furthermore, since persons can be detected individually, processing after contour extraction, for example, the tracking of a certain person or performing of different operations according to different persons, etc., upon performing face recognition, etc., can be facilitated.

In a case where a plurality of moving objects (persons) exist at the object distance, the region of the moving object for which detection has been completed may be deleted (by setting the pixel values to "0") from the distance image generated at distance information generating part 11 and moving objects may be detected successively from the distance image on which deletion has been performed.

The arrangement of moving object detection device 1C was described above as an embodiment, and moving object detection device 1C may be realized by making a general computer execute a program and thereby making the computation devices and storage devices inside the computer operate.

Also, though here, distance information generating part 11 of moving object detection device 1C generates a distance image based on camera images taken by two cameras 2, arrangements may be made to generate a distance image from three or more cameras. For example, by using nine cameras positioned in three rows and three columns, using the camera positioned at the center as the reference camera, and generating a distance image based on the parallaxes with respect to the other cameras, the distance to a moving object can be measured more accurately.

Also here, moving object detection device 1C is arranged as a device for detecting approaching persons. However, in a case where moving objects are to be detected without limitation to persons, skin tone region image generating part 14 and skin tone region judging part 24a may be omitted from moving object detection device 1C.

(Operations of Moving Object Detection Device 1C)

Figure 15:
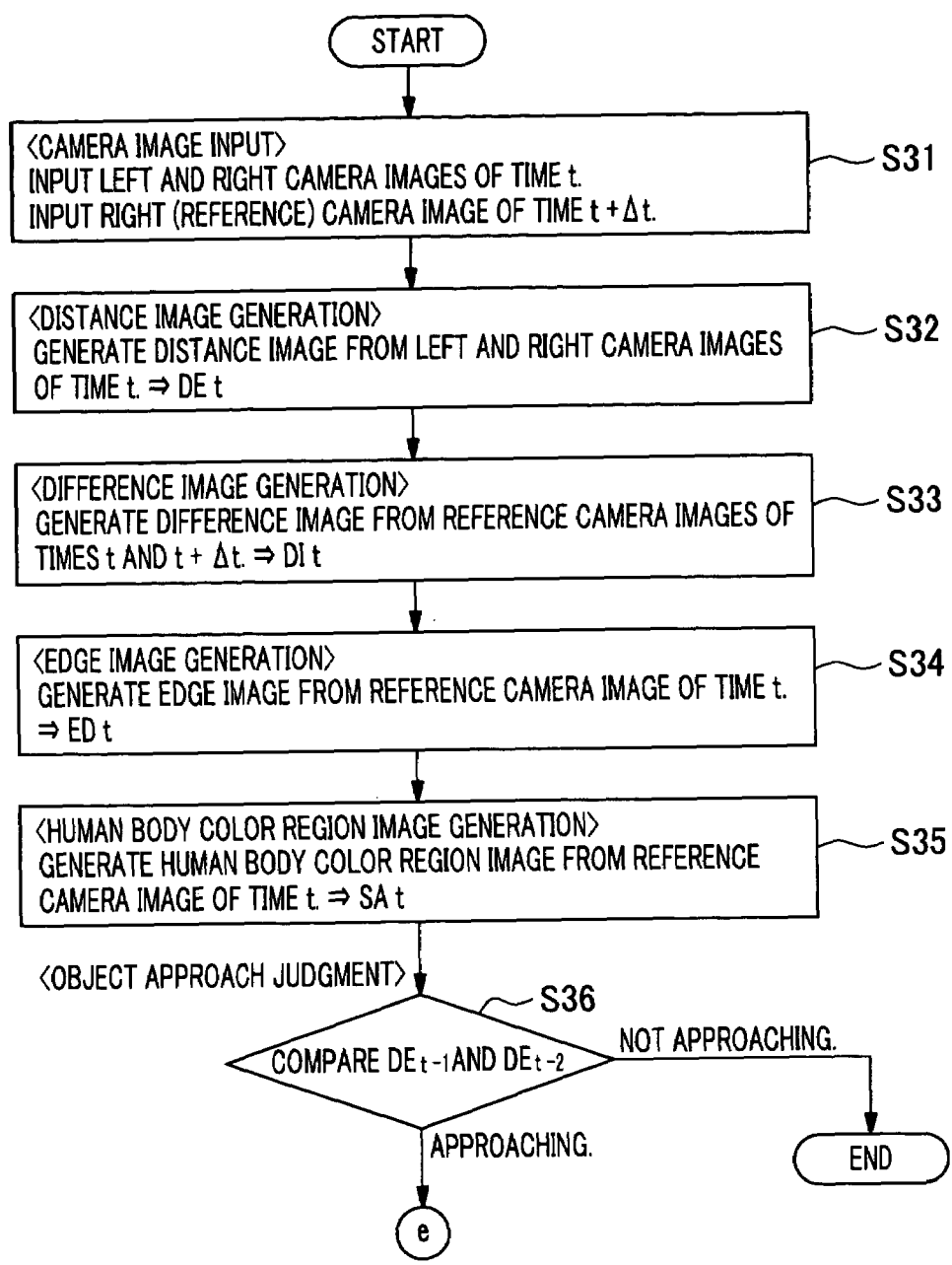
FIG. 15 is a flowchart (1/3) showing the operations of the moving object detection device that is the third embodiment of this invention.
Figure 16:
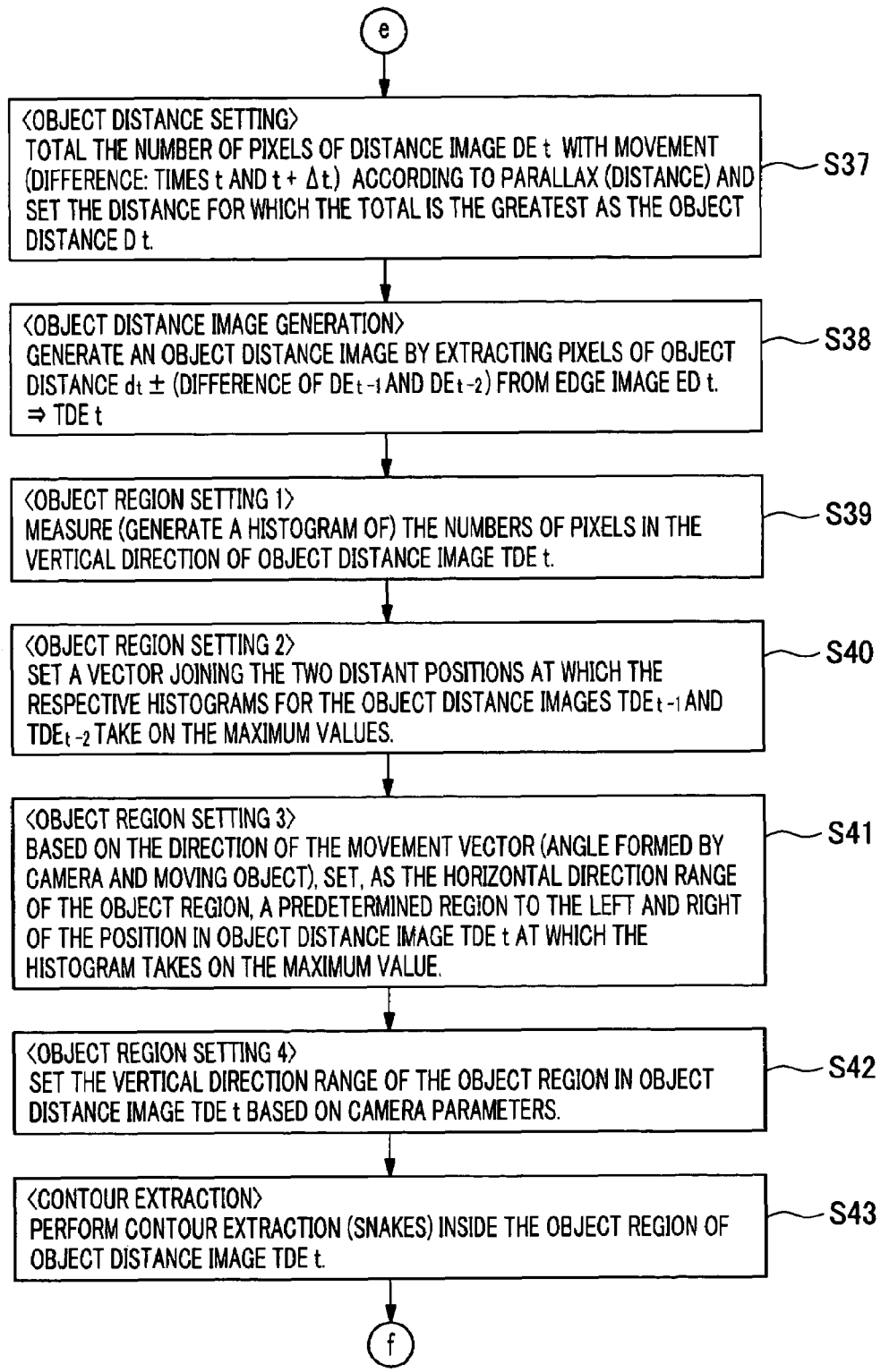
FIG. 16 is a flowchart (2/3) showing the operations of the moving object detection device that is the third embodiment of this invention.
Figure 17:
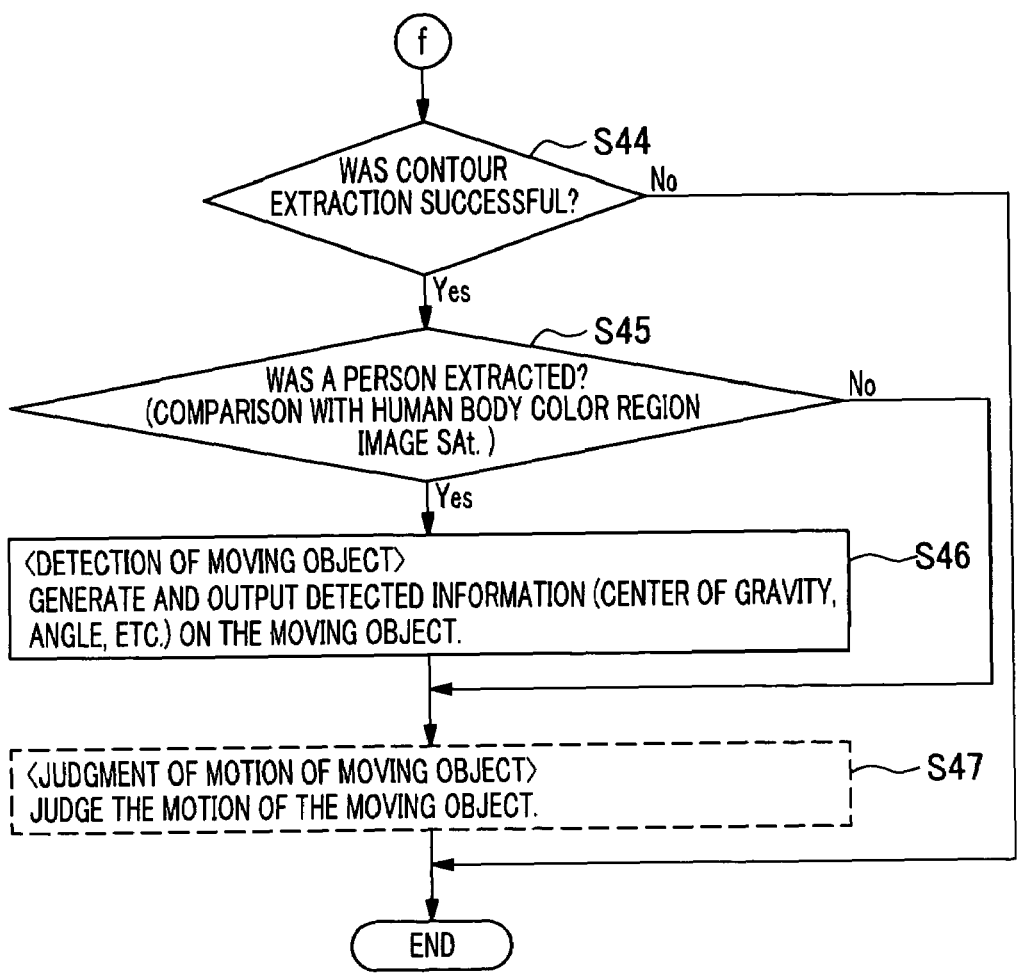
FIG. 17 is a flowchart (3/3) showing the operations of the moving object detection device that is the third embodiment of this invention.

The operations of moving object detection device 1C shall now be described with reference to FIG. 15 through FIG. 17 (and with reference to FIG. 14 where necessary). FIG. 15 through FIG. 17 are flowcharts showing the operations of moving object detection device 1C.

<Camera Image Input Step>

First, moving object detection device 1C inputs camera images in time series from two cameras 2 that are synchronized (step S31). Here, the contour of a moving object shall be extracted based on camera images input from right camera 2a (reference camera) and left camera 2b at a certain time t and camera images input from right camera 2a (reference camera) and left camera 2b at a subsequent time t+Δt. Distance images $DE_{t-1}$ and $DE_{t-2}$ and object distance images $TDE_{t-2}$ and $TDE_{t-1}$, which are used in the following steps, are generated at the stages of time t−2 and time t−1.

<Distance Image Generation Step>

Moving object detection device 1C then generates, by means of distance information generating part 11, a distance image $DE_t$ in which are embedded parallaxes (distances) to image-taken objects determined from the two camera images input at time t from right camera 2a (reference camera) and left camera 2b (step S32).

<Difference Image Generating Step>

Furthermore, by means of movement information generating part 12, moving object detection device 1C determines the differences of two camera images (reference camera images) taken by right camera 2a (reference camera) at time t and time t+Δt and generates a difference image $DI_t$, wherein the pixel value of a pixel with which there is a difference is set to "1" and the pixel value of a pixel with which there is no difference is set to "0" (step S33).

<Edge Image Generating Step>

Also, by means of edge image generating part 13, moving object detection device 1 generates an edge image $ED_t$ from the camera image (reference camera image) taken at time t by right camera 2a (reference camera) (step S34).

<Human Body Color Region Image Generating Step>

Furthermore, by means of skin tone region image generating part 14, moving object detection device 1C generates a skin tone region image $SA_t$, with which skin tone regions are extracted from the camera image (reference camera image) taken at time t by right camera 2a (reference camera) (step S35).

<Object Approach Judging Step>

Then by means of object approach judging part 21a of object distance setting part 21B, moving object detection device 1C judges whether or not moving objects are approaching by comparing the pixel values of distance image $DE_{t-1}$ generated in step S32 at time t−1 and distance image $DE_{t-2}$ generated in step S32 at time t−2 (step S36).

Here, if moving objects that are approaching are recognized (step S36: approaching), step S37 of FIG. 16 is entered. On the other hand, if a moving object that is approaching could not be recognized (step S36: not approaching) the moving object detection operation is ended.

<Object Distance Setting Step>

Also, by means of object distance setting part 21B and based on the distance image $DE_t$ and difference image $DI_t$ (difference image of time t and time t+Δt) generated in step S32 and step S33, moving object detection device 1C totals the number of pixels with which there is movement according to each parallax (distance) expressed in distance image $DE_t$ and sets the distance for which the total of the number of pixels with movement (difference) is the greatest as the object distance $d_t$ of a moving object to be detected in distance image $DE_t$ (step S37).

<Object Distance Image Generating Step>

Furthermore, by means of object distance image generating part 22B, moving object detection device 1 then generates an object distance image $TDE_t$ by extracting pixels corresponding to the object distance $d_t$ (differences of $DE_{t-1}$ and $DE_{t-2}$) from edge image $ED_t$ generated in step S34 (step S38)

In this step S38, moving object detection device 1C may set the depth direction range in which a moving object exists in distance image $DE_t$ of time t.

<Object Region Setting Step>

Then by means of object region setting part 23, moving object detection device 1C generates a histogram to measure the numbers of pixels in the vertical direction (up/down direction) of object distance image $TDE_t$, generated in step S38 (step S39).

Moving object detection device 1C furthermore sets a movement vector by joining the position, at which the histogram, measured from object distance image $TDE_{t-2}$ in step S39 of time t−2, takes on the maximum value, and the position, at which the histogram, measured from object distance image $TDE_{t-1}$ in step S39 of time t−1, takes on the maximum value (step S40).

Then based on this movement vector, moving object detection device 1C sets, in object distance image $TDE_t$ of time t, a predetermined left/right region centered at position $H_t$ at which the histogram takes on the maximum value (see FIG. 22) as the horizontal direction range of the object region (step S41). Here, it shall be assumed that a person is to be detected, and in the case where the angle formed by the movement vector and the sight line direction of cameras 2 is less than 45°, the horizontal direction range for detecting a person is set to central position $H_t$±(0.5 to 0.6) m. Also in the case where the angle formed by the movement vector and the sight line direction of cameras 2 is greater than or equal to 45°, the horizontal direction range for detecting a person is set to central position $H_t \pm (0.2$ to $0.3)$ m.

Furthermore, at object region setting part 23, the vertical (up/down) direction range of the object region is set in object distance image $TDE_t$ based on the tilt angle, height from the floor (installation surface), and other camera parameters input from cameras 2 (step S42).

For example, based on the tilt angle and height from the floor of cameras 2, the position of the floor (bottom end of the object region) in the image of the object distance image is determined. Then based on the view angle of cameras 2 and the distance to the moving object, a range of 2 m from the floor is converted into the number of pixels to determine the number of pixels from the floor of the object region in the object distance image. The top end of the object region in the object distance image can thus be determined. As this top end of the object region, the position (height) of 2 m in the image of the object distance image may be determined directly based on the tilt angle and height from the floor of cameras 2. This "2 m" is just an example and another length (height) may be used instead.

<Contour Extraction Step>

Also by means of contour extraction part 24C, moving object detection device 1C extracts a contour inside the object region set in step S41 and step S42 in object distance image $TDE_t$ generated in step S38 (step S43). For example, a contour is extracted by applying the active contour model (SNAKES) inside the object region.

Whether or not contour extraction was successful is then judged (step S44). Here, the judgment of success or failure of contour extraction may include not just the judgment of whether or not it was possible to extract a contour in step S43 but also the judgment of not performing contour extraction of an object, for example, due to the object distance being further away than a predetermined distance, the object region being smaller than a predetermined size, and other reasons.

If in step S44, it is judged that contour extraction was successful ("Yes"), step S45 is entered. On the other hand, if contour extraction has failed (or contour extraction is not performed) ("No"), the present operations are ended.

<Person Extraction Step>

In the case where contour extraction of a moving object was successful, moving object detection device 1C judges, by means of skin tone region judging part 24a of contour extraction part 24C, whether or not a skin tone region in skin tone region image $SA_t$, generated in step S35, is contained in the moving object contour extracted at contour extraction part 24C to thereby judge whether or not the contour is the contour of a person (step S45).

If skin tone region judging part 24a judges that the moving object contour is the contour of a person ("Yes"), contour extraction part 24C generates and outputs the detected information on the moving object to the exterior (step S46) and step S47 is entered. The detected information on the moving object include such information as the center-of-gravity coordinates of the moving object, the tilt angle of cameras 2, various angles indicating the movement direction of the moving object, etc. On the other hand, if skin tone region judging part 24a judges that the moving object contour is not the contour of a person (step S45 "No"), step S47 is entered.

<Moving Object Motion Judgment Step>

By moving object detection device 1C outputting the detected information on the moving object in step S46, for example, the control device (not shown) of a moving robot judges the motion of the moving object. (step S47)

By means of the respective steps described above, moving object detection device 1C of the present embodiment enables, from camera images taken by cameras 2, the detection of moving objects existing in the camera images. Also, though here a moving object at time t was detected, by making the operations of the above-described steps (step S31 to step S47) be performed based on camera images that are input from time to time, a moving body, such as a moving robot, etc., can continue to detect a person.

In step S41, object region setting part 23 sets the vertical range to 2 m in the case where the distance to the moving object (person) is approximately 2 m and the angle formed by the movement vector and sight line direction of cameras 2 is less than 45° and deletes 30% of the lower side of the vertical direction range in other cases. By doing so, in a case where a person exists at a specific distance (2 m in the present case) and is approaching, the person can be detected most precisely and in other cases, the calculation load for person detection can be lightened.

As described above, with the present invention, since whether or not a moving object is approaching can be judged, just the detection of approaching moving objects can be performed to hold down the calculation amount necessary for contour extraction and increase the processing speed for detection of moving objects.

Also, the object distance and object region for detecting a moving object can be set automatically and the object distance and object region can be restricted. The processing speed for detection of moving objects can be increased and the precision of detection can be increased as well.

Furthermore by this invention, since the vertical direction range of a moving object in the object distance image can be narrowed down based on the cameras' tilt angle, height from the floor, etc., the calculation amount necessary for contour extraction can be held down and the processing speed for detection of moving objects can be increased.

Also with this invention, since an edge image is generated in advance by the extraction of edges from a camera image, there is no need to detect edges in the process of performing contour extraction on an individual moving object region (object region). Thus even in a case where plurality of moving objects exist in a joined manner in a camera image, since the extraction of edges is not performed on overlapping regions, moving objects can be detected at high speed.

What is claimed is:

1. A moving object detection device, detecting, from a plurality of taken images of image-taken objects taken by a plurality of synchronized image pickup means, moving objects existing among the image-taken objects, comprising:
    a distance information generating means, generating distance information in the form of distances to the image-taken objects based on the parallaxes of the plurality of taken images;
    a movement information generating means, generating movement information in the form of movements of the moving objects based on the differences of taken images input in time series from at least one of the image pickup means among the plurality of image pickup means;

an object distance setting means, setting, based on the distance information and the movement information, an object distance at which an abovementioned moving object exists;

an object distance image generating means, generating, based on the distance information, an object distance image comprising pixels corresponding to the object distance set by the object distance setting means;

an object region setting means, setting, within the object distance image and in correspondence to at least the object distance, an object region to be subject to the detection of an abovementioned moving object; and a contour extraction means, extracting a contour from the object region set by the object region setting means and thereby detecting the abovementioned moving object.

2. The moving object detection device according to claim 1, wherein the object distance setting means determines, according to distance, the totals of pixels with which there is movement, and sets the object distance, at which an abovementioned moving object exists, based on these totals.

3. The moving object detection device according to claim 1, wherein the object distance image generating means generates an object distance image comprising pixels that exist within a predetermined range in the depth direction based on at least the object distance.

4. The moving object detection device according to claim 1, wherein the object region setting means sets, based on pixel amounts in the vertical direction in the object distance image, the object region within a predetermined range in the horizontal direction from the peak of the pixel amounts.

5. The moving object detection device according to claim 1, wherein the object region setting means sets the vertical direction range of the object region based on at least the tilt angle and the height from the installation surface of the image pickup means.

6. The moving object detection device according to claim 1, further comprising: an edge image generating means, generating an edge image by extracting edges from an abovementioned taken image based on the color information or gray scale information of the respective pixels of the taken image; wherein the object distance image generating means extracts, based on the distance information, pixels of the edge image that correspond to the object distance to generate the object distance image.

7. The moving object detection device according to claim 1, further comprising: a distance information renewal means, renewing the distance information upon deeming the internal region of the contour extracted by the contour extraction means as a region from which the moving object has been extracted.

8. A moving object detection method, by which moving objects with movement are detected from among image-taken objects based on distance information, concerning distances to the image-taken objects and generated based on taken images taken by a plurality of synchronized image pickup means, and movement information, generated based on taken images input in time series from at least one of the image pickup means among the plurality of image pickup means, comprising:

an object distance setting step of setting, based on the distance information and the movement information, an object distance at which an abovementioned moving object exists;

an object distance image generating step of generating, based on the distance information, an object distance image comprising pixels corresponding to the object distance set in the object distance setting step;

an object region setting step of setting, within the object distance image and in correspondence to at least the object distance, an object region to be subject to the detection of an abovementioned moving object; and a contour extraction step of extracting a contour from the object region set in the object region setting step and thereby detecting the abovementioned moving object.

9. A moving object detection program stored on a computer readable medium, which, in order to detect moving objects with movement from among image-taken objects based on distance information, concerning distances to the image-taken objects and generated based on taken images taken by a plurality of synchronized image pickup means, and movement information, generated based on taken images input in time series from at least one of the image pickup means among the plurality of image pickup means, makes a computer function as:

an object distance setting means, setting, based on the distance information and the movement information, an object distance at which an abovementioned moving object exists;

an object distance image generating means, generating, based on the distance information, an object distance image comprising pixels corresponding to the object distance set by the object distance setting means;

an object region setting means, setting, within the object distance image and in correspondence to at least the object distance, an object region to be subject to the detection of an abovementioned moving object; and a contour extraction means, extracting a contour from the object region set by the object region setting means and thereby detecting the abovementioned moving object.

10. A moving object detection device, detecting, from a plurality of taken images of image-taken objects taken by a plurality of synchronized image pickup means, moving objects existing among the image-taken objects, comprising:

a distance information generating means, generating distance information in the form of distances to the image-taken objects based on the parallaxes of the plurality of taken images;

a movement information generating means, generating movement information in the form of movements of the moving objects based on the differences of taken images input in time series from at least one of the image pickup means among the plurality of image pickup means;

an object approach judging means, judging, based on the differences of the distance information generated at predetermined time intervals, whether or not abovementioned moving objects are approaching the image pickup means;

an object distance setting means, setting, based on the distance information and the movement information, an object distance at which an abovementioned moving object exists in the case where the judgment result of the object approach judgment means indicates that abovementioned moving objects are approaching the image pickup means;

an object distance image generating means, generating, based on the distance information, an object distance image comprising pixels corresponding to the object distance set by the object distance setting means;

an object region setting means, setting, within the object distance image and in correspondence to at least the object distance, an object region to be subject to the detection of an abovementioned moving object; and a contour extraction means, extracting a contour from the object region set by the object region setting means and thereby detecting the abovementioned moving object.

11. The moving object detection device according to claim 10, wherein the object distance setting means sets the object distance by providing the distance, for which the total of the pixels with movement is the greatest, with a width in the depth direction, within which abovementioned moving objects exist, based on the differences of the distance information generated at predetermined time intervals.

12. The moving object detection device according to claim 10, wherein the object region setting means measures pixel amounts in the vertical direction in each of a plurality of object distance images generated by the object distance image generating means, specifies the movement direction of an abovementioned moving object based on the positions at which the pixel amounts peak in the respective abovementioned object distance images, and sets a priorly determined horizontal direction width in correspondence to the movement direction as the horizontal direction range of the abovementioned moving object.

13. The moving object detection device according to claim 10, wherein the object region setting means sets the vertical direction range of the object region based on at least the tilt angle and the height from the installation surface of the image pickup means.

14. The moving object detection device according to claim 10, further comprising: an edge image generating means, generating an edge image by extracting edges from an abovementioned taken image based on the color information or gray scale information of the respective pixels of the taken image; wherein the object distance image generating means extracts, based on the distance information, pixels of the edge image that correspond to the object distance to generate the object distance image.

15. A moving object detection method, by which moving objects with movement are detected from among image-taken objects based on distance information, concerning distances to the image-taken objects and generated based on taken images taken by a plurality of synchronized image pickup means, and movement information, generated based on taken images input in time series from at least one of the image pickup means among the plurality of image pickup means, comprising:

an object approach judging step of judging, based on the differences of the distance information generated at predetermined time intervals, whether or not abovementioned moving objects are approaching the image pickup means;

an object distance setting step of setting, based on the distance information and the movement information, an object distance at which an abovementioned moving object exists in the case where the judgment result of the object approach judgment step indicates that abovementioned moving objects are approaching the image pickup means;

an object distance image generating step of generating, based on the distance information, an object distance image comprising pixels corresponding to the object distance set in the object distance setting step;

an object region setting step of setting, within the object distance image and in correspondence to at least the object distance, an object region to be subject to the detection of an abovementioned moving object; and a contour extraction step of extracting a contour from the object region set in the object region setting step and thereby detecting the abovementioned moving object.

16. A moving object detection program stored on a computer readable medium, which, in order to detect moving objects with movement from among image-taken objects based on distance information, concerning distances to the image-taken objects and generated based on taken images taken by a plurality of synchronized image pickup means, and movement information, generated based on taken images input in time series from at least one of the image pickup means among the plurality of image pickup means, makes a computer function as:

an object approach judging means, judging, based on the differences of the distance information generated at predetermined time intervals, whether or not abovementioned moving objects are approaching the image pickup means;

an object distance setting means, setting an object distance at which an abovementioned moving object exists based on the distance information and the movement information in the case where the judgment result of the object approach judgment means indicates that abovementioned moving objects are approaching the image pickup means;

an object distance image generating means, generating, based on the distance information, an object distance image comprising pixels corresponding to the object distance set by the object distance setting means;

an object region setting means, setting, within the object distance image and in correspondence to at least the object distance, an object region to be subject to the detection of an abovementioned moving object; and a contour extraction means, extracting a contour from the object region set by the object region setting means and thereby detecting the abovementioned moving object.

* * * * *